United States Patent [19]

Dearing, Sr. et al.

[11] Patent Number: 5,624,182

[45] Date of Patent: Apr. 29, 1997

[54] AUTOMATIC CEMENTING SYSTEM WITH IMPROVED DENSITY CONTROL

[75] Inventors: Michael P. Dearing, Sr., Cypress; Bruce A. Vicknair, Baytown; Randall R. Price, Houston; Robert A. Baten, Friendsword; Greg L. Cedillo; John H. Craig, both of Houston, all of Tex.

[73] Assignee: Stewart & Stevenson Services, Inc., Houston, Tex.

[21] Appl. No.: 394,476

[22] Filed: Feb. 27, 1995

Related U.S. Application Data

[63] Continuation-in-part of Ser. No. 178,659, Jan. 7, 1994, and a continuation-in-part of Ser. No. 308,477, Sep. 19, 1994, which is a continuation of Ser. No. 969,944, Oct. 30, 1992, said Ser. No. 178,659, is a continuation-in-part of Ser. No. 969,944, which is a division of Ser. No. 389,923, Aug. 2, 1989, Pat. No. 5,281,023.

[51] Int. Cl.$^6$ .................................................. B01F 15/04
[52] U.S. Cl. ................... 366/2; 366/17; 366/20; 366/152.2
[58] Field of Search ......................... 366/17, 20, 65, 366/152, 2; 166/308

[56] References Cited

U.S. PATENT DOCUMENTS

| | | | |
|---|---|---|---|
| 2,658,644 | 11/1953 | Lowe | 222/52 |
| 3,004,544 | 10/1961 | Guptill, Jr. | 366/17 |
| 3,161,203 | 12/1964 | Hathorn | 137/8 |
| 3,326,536 | 6/1967 | Zingg et al. | 259/154 |
| 3,379,421 | 4/1968 | Putman | 259/154 |
| 3,757,864 | 9/1973 | Crawford et al. | 166/308 |
| 3,818,991 | 6/1974 | Nimerick | 166/283 |
| 3,980,136 | 9/1976 | Plummer et al. | 166/280 |
| 4,003,431 | 1/1977 | Noyotny et al. | 366/17 |
| 4,091,462 | 5/1978 | Igarasihi et al. | 366/17 |
| 4,126,181 | 11/1978 | Black | 166/280 |
| 4,176,064 | 11/1979 | Black | 210/196 |
| 4,209,258 | 6/1980 | Oakes | 366/138 |

(List continued on next page.)

FOREIGN PATENT DOCUMENTS

| | | | |
|---|---|---|---|
| 260470 | 9/1970 | U.S.S.R. | 366/17 |
| 719881 | 3/1980 | U.S.S.R. | 366/17 |
| 814924 | 3/1981 | U.S.S.R. | 366/17 |
| 1110644 | 8/1984 | U.S.S.R. | |

OTHER PUBLICATIONS

Precision Meets Dependability for the Perfect Mix (Dowell Schlumberger Advertisement).
*Documents relating to communications between assignee, Stewart & Stevenson, and Dowell Schlumberger.*

(List continued on next page.)

*Primary Examiner*—Frankie L. Stinson
*Attorney, Agent, or Firm*—Conley, Rose & Tayon, P.C.

[57] ABSTRACT

An automatic cementing system and method are disclosed for precisely controlling the density of a slurry during a continuously mixed cement application. The system includes an input water line and a dry cement hopper for supplying water and dry cement, respectively, to a mixing chamber. The mixing chamber includes two chambers, Chamber A and Chamber B, for thoroughly mixing the water and cement together to form a cement slurry. Chamber B includes a level sensor for measuring the change in slurry level. The input line includes a pump for supplying the water to the mixing chamber, and a flow meter for measuring the rate at which the water is supplied. Similarly, the hopper includes a rotary valve for regulating the rate at which the dry cement is supplied to the mixing chamber and a speed sensor for measuring the speed of the rotary valve. A discharge line with a discharge pump and a discharge flow meter receives and discharges cement slurry. A recirculation line is included for density control during initialization. A system controller receives operational parameters from the operator, including desired slurry density, mix water density and dry cement density. Once the rate of the input pump is set, the controller monitors the output from the level sensor in Chamber B and adjusts the rotary valve until the level of slurry in Chamber B is constant. At that time, the amount of water leaving the system as slurry is calculated by the controller, and the controller then sets the rate of the input pump based upon this calculation.

20 Claims, 22 Drawing Sheets

U.S. PATENT DOCUMENTS

| | | |
|---|---|---|
| 4,265,262 | 5/1981 | Hotine .................................... 137/2 |
| 4,265,266 | 5/1981 | Kierbow et al. .................... 137/101.19 |
| 4,298,288 | 11/1981 | Weisbrod ............................ 366/20 X |
| 4,327,759 | 5/1982 | Millis .................................... 137/3 |
| 4,353,482 | 10/1982 | Tomlinson et al. ...................... 222/1 |
| 4,436,431 | 3/1984 | Strong et al. ........................... 366/17 |
| 4,456,069 | 6/1984 | Vigneri ................................... 166/303 |
| 4,474,204 | 10/1984 | West ........................................ 137/88 |
| 4,475,818 | 10/1984 | Bialkowski ............................ 366/17 |
| 4,538,222 | 8/1985 | Crain . |
| 4,665,982 | 5/1987 | Brown ..................................... 166/250 |
| 4,701,095 | 10/1987 | Berryman et al. ..................... 414/332 |
| 4,726,219 | 2/1988 | Pearson et al. ......................... 73/53 |
| 4,779,186 | 10/1988 | Handke et al. ......................... 364/172 |
| 4,845,981 | 7/1989 | Pearson .................................. 73/151 |
| 4,887,670 | 12/1989 | Lord et al. .............................. 166/281 |
| 4,911,241 | 3/1990 | Williamson et al. .................... 166/308 |
| 4,930,576 | 6/1990 | Berryman et al. ...................... 166/308 |
| 5,114,239 | 5/1992 | Allen ................................... 366/17 X |
| 5,281,023 | 1/1994 | Cedillo et al. ........................... 366/17 |

OTHER PUBLICATIONS

Introduction to Petroleum Production, vol. 1, Chapter 4; D. R. Skinner; *Well Completions;* Gulf Publishing Co., 1981; (pp. 69–95).

Technical Paper; *Cement Mixing: Better Understanding and New Hardware* by Galiana, et al; reprinted from Oilfield Review 3, No. 2 (Apr. 1991):11–21.

Society of Petroleum Engineers, 1991; *Process of Control of Slurry Density: Impact on Field Performance of Slurry Density* by R. J. Hitt, et al; (pp. 519–527).

Offshore Technology Conference, 1992; *Automatic Density Control and High Specific Mixing Energy Deliver Consistent High–Quality Cement Slurries* by C. Stegemoeller, et al; (pp. 725–736).

Offshore Technology Conference, 1992; *Automatic Control of Bulk Cement Tank Levels* by D. A. Wienck, et al; (pp. 737–740).

Society of Petroleum Engineers, 1990; *New Slurry Mixer Density Control in Cementing Operations* by E. O'Neill, et al.

Block Diagram, Stewart & Stevenson Services, Inc.

Sales Information relating to present invention.

"Technique Helps Extend Cotton Valley Frac," Thomas M. Hopkins, II, T.M. Hopkins, Inc., Audis Byrd and R.E. Hyden, Halliburton Services.

Frac/Blender Unit Lightweight, Automated, Stewart & Stevenson Services, Inc.

*Documents relating to communications between assignee, Stewart & Stevenson, and Dowell Schlumberger.*

*Documents relating to communications between assignee Stewart & Stevenson, and Servicios Especiales San Antonio, S.A..*

*Documents relating to communications between assignee Stewart & Stevenson, and Globe Oilwell Services, Inc..*

*Documents relating to communications between assignee Stewart & Stevenson, and National Petroleum Services Co..*

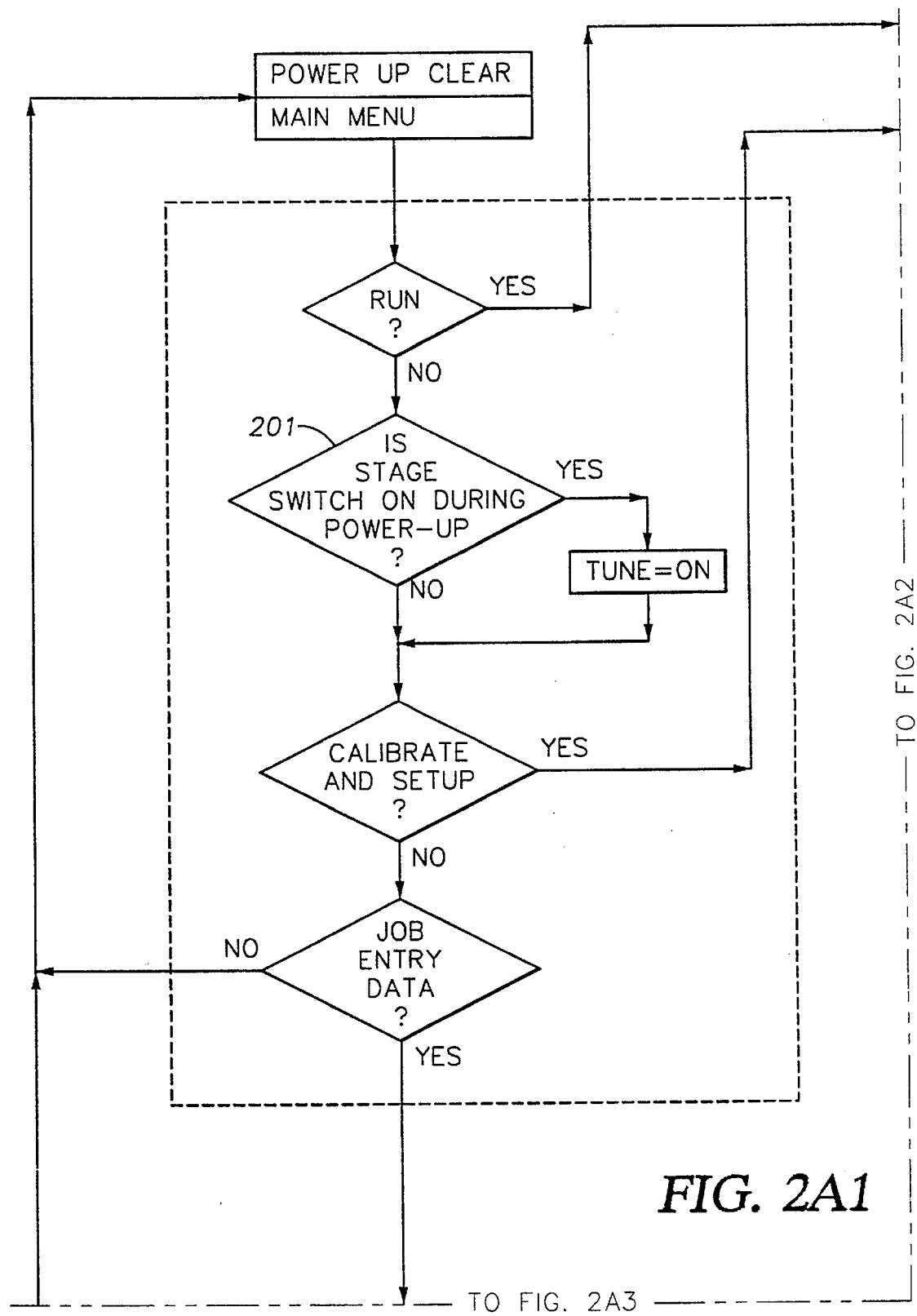
FIG. 2A1

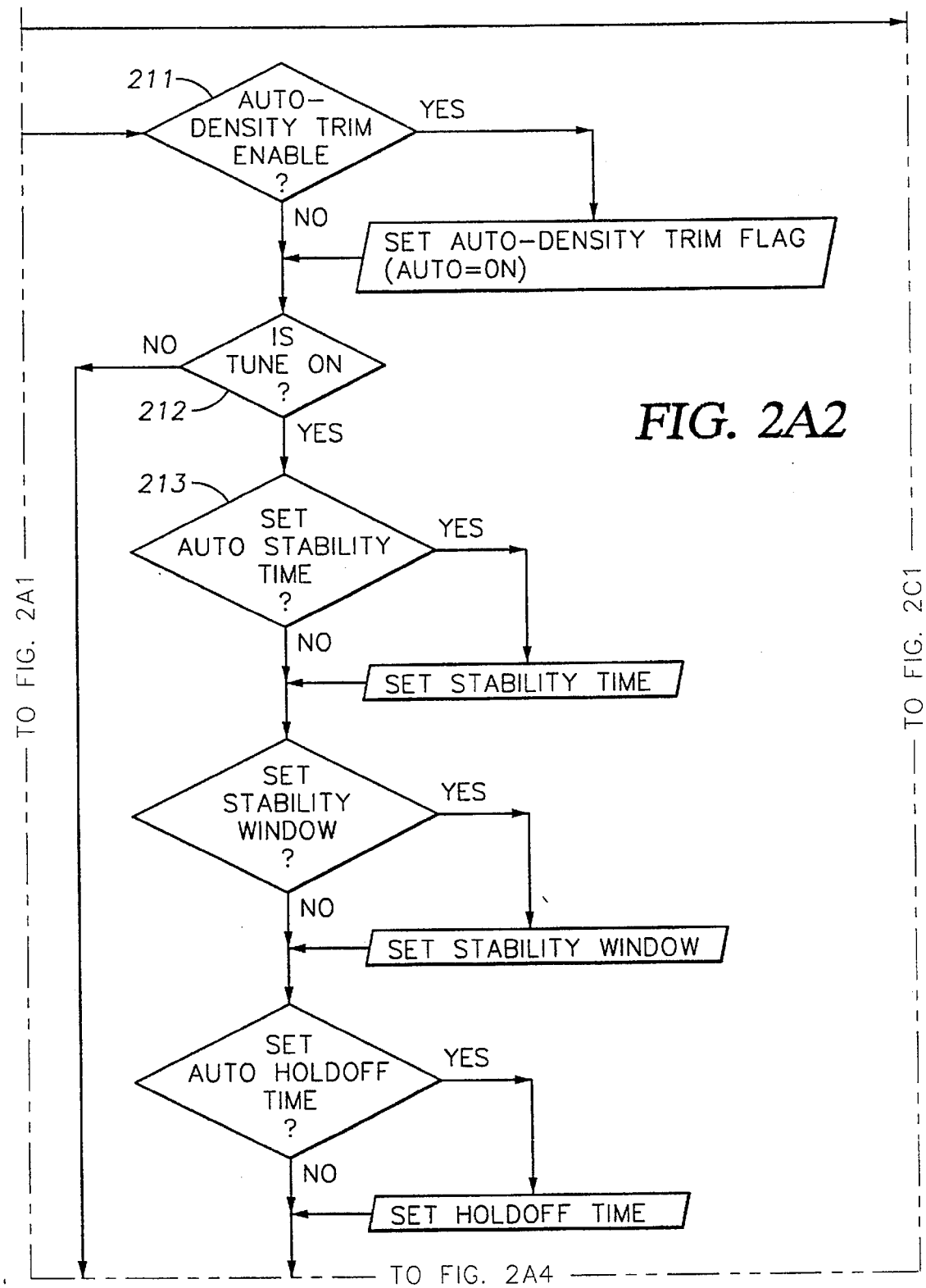
FIG. 2A2

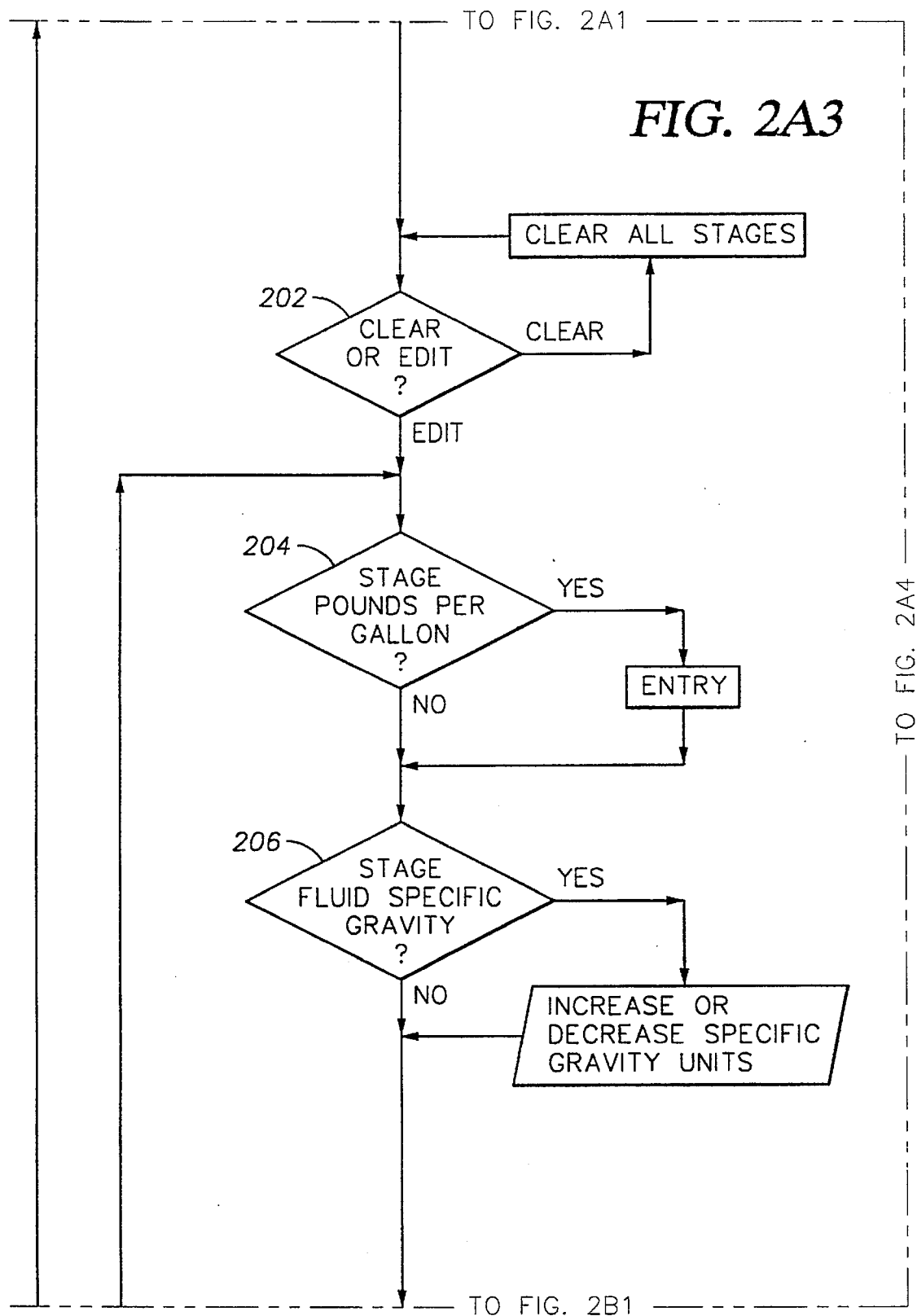

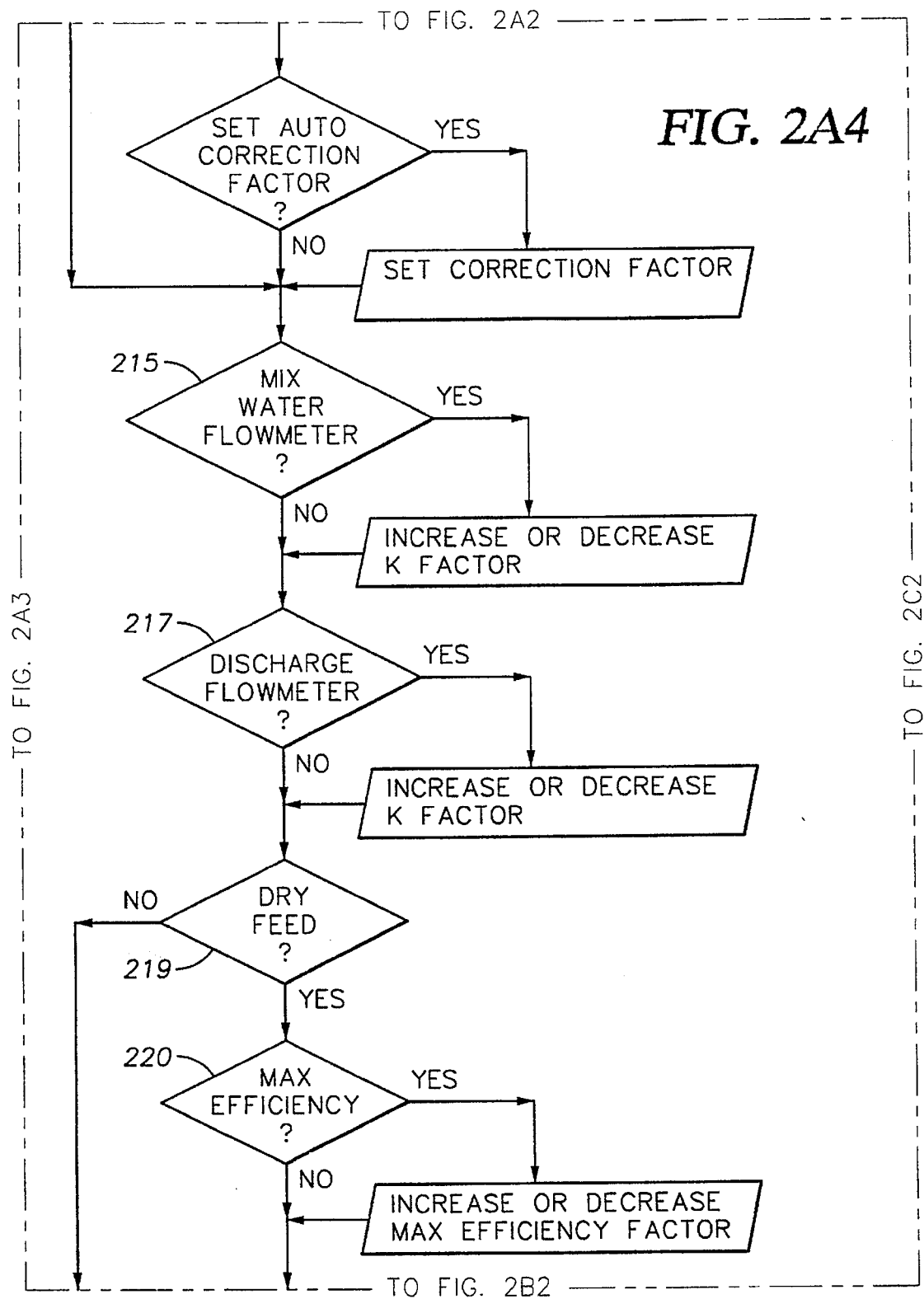
FIG. 2A4

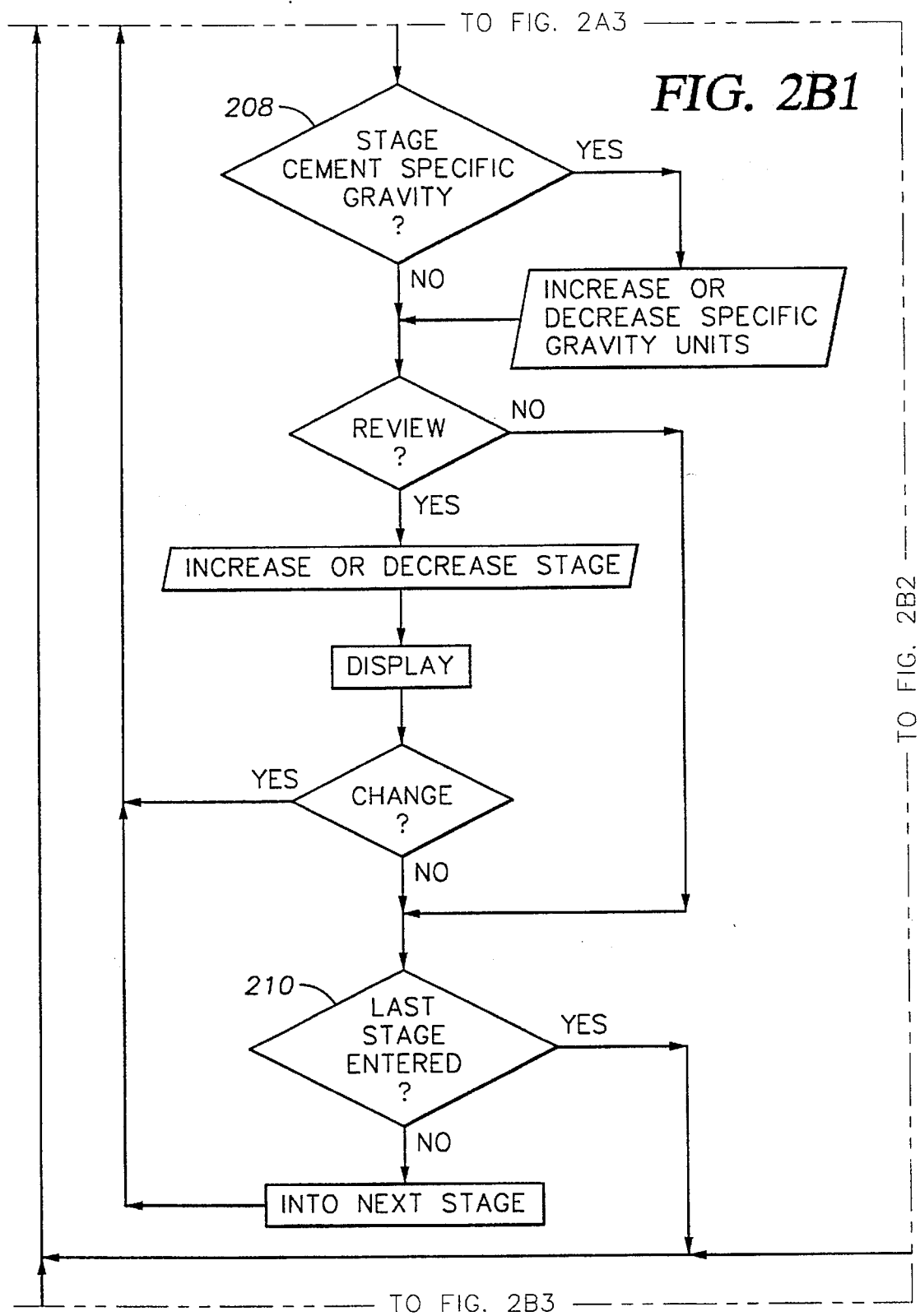
FIG. 2B1

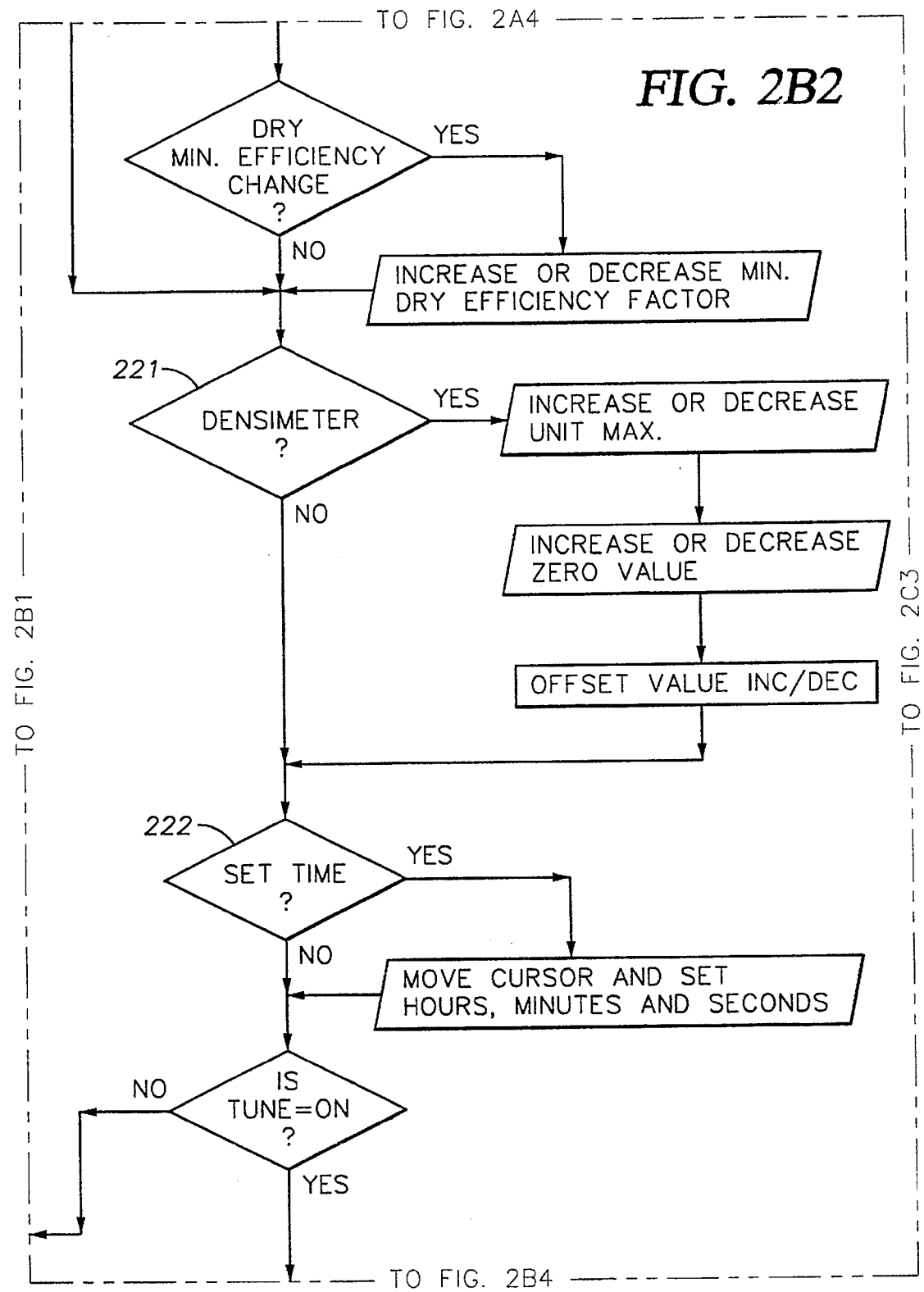

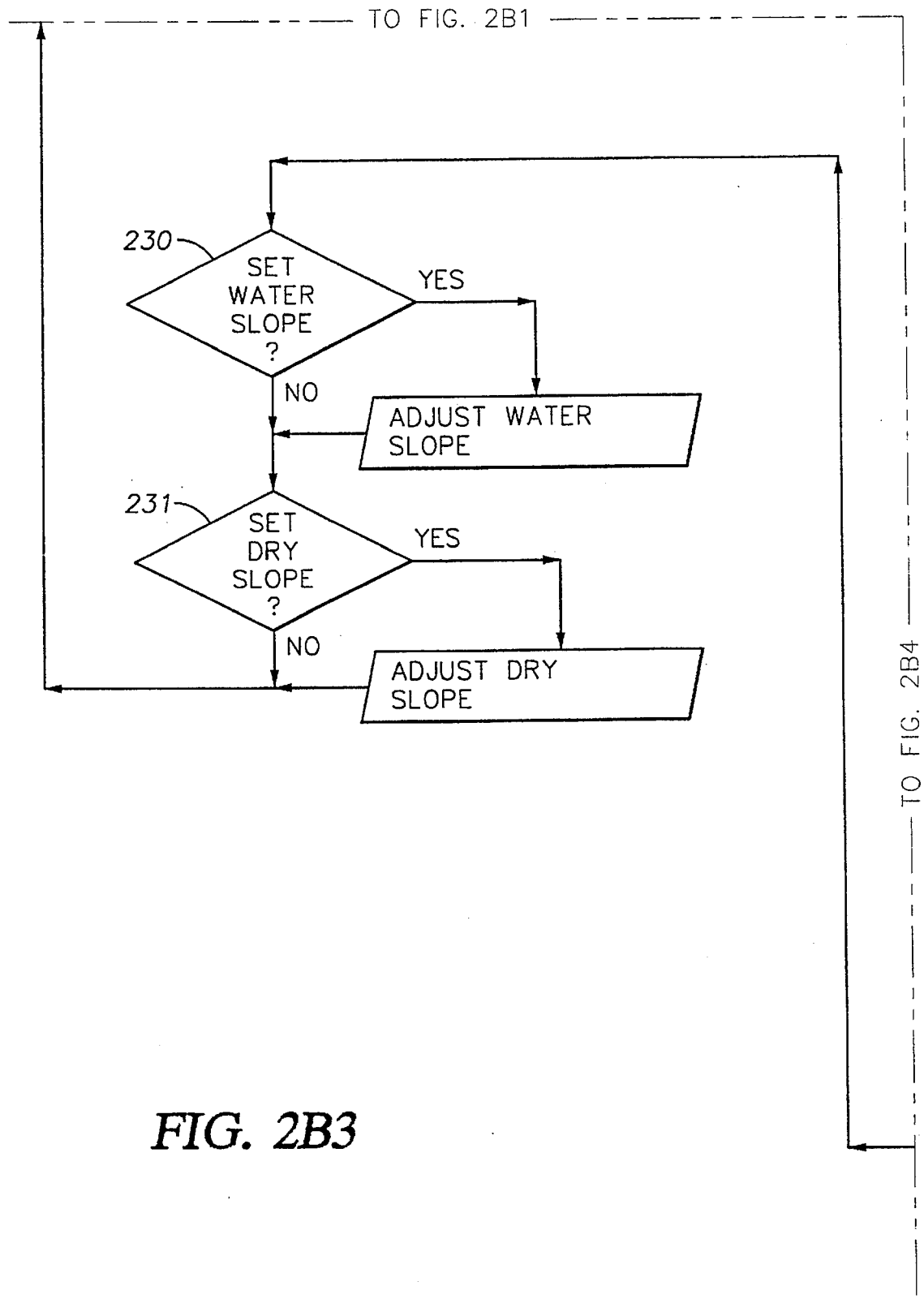
*FIG. 2B3*

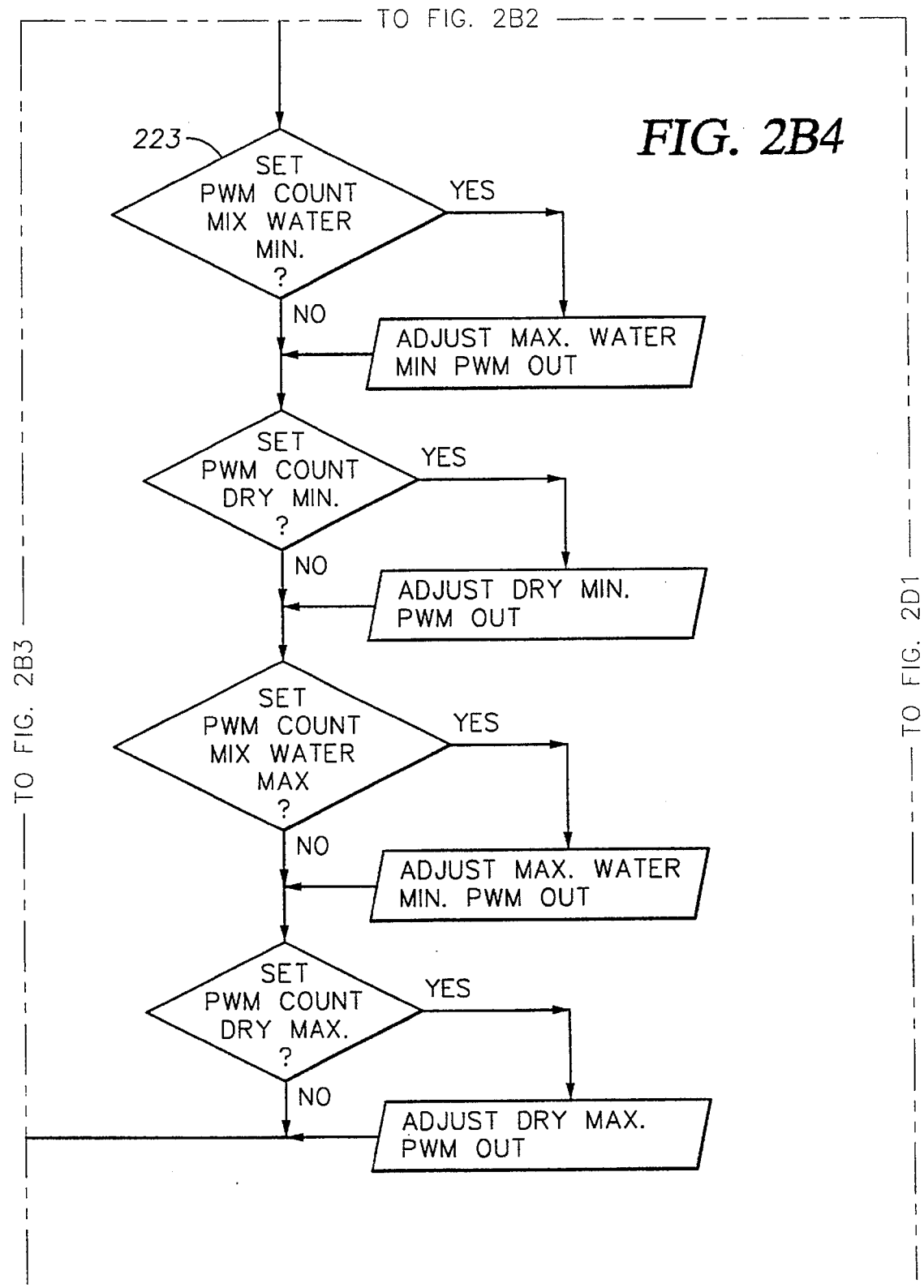
FIG. 2B4

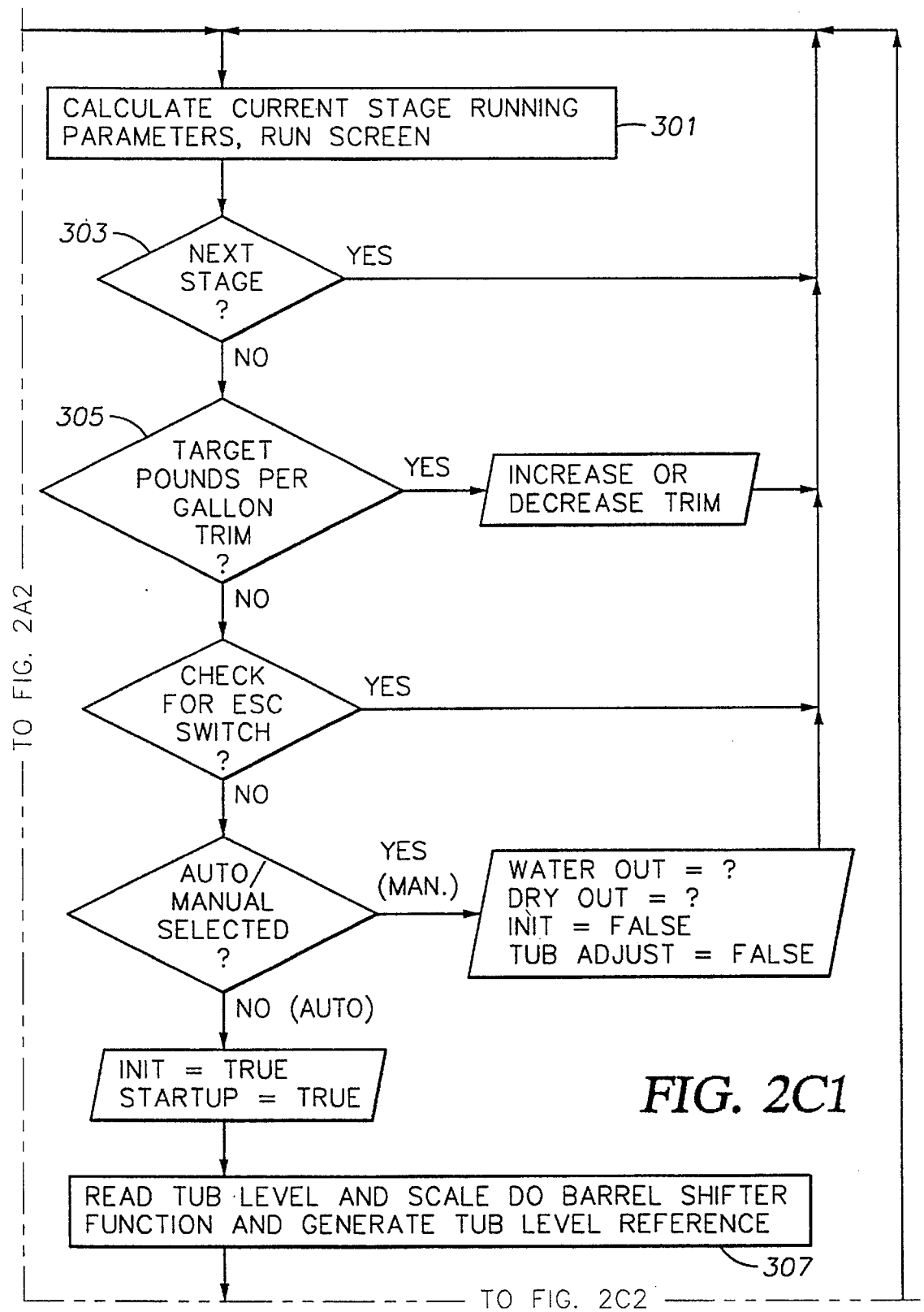
FIG. 2C1

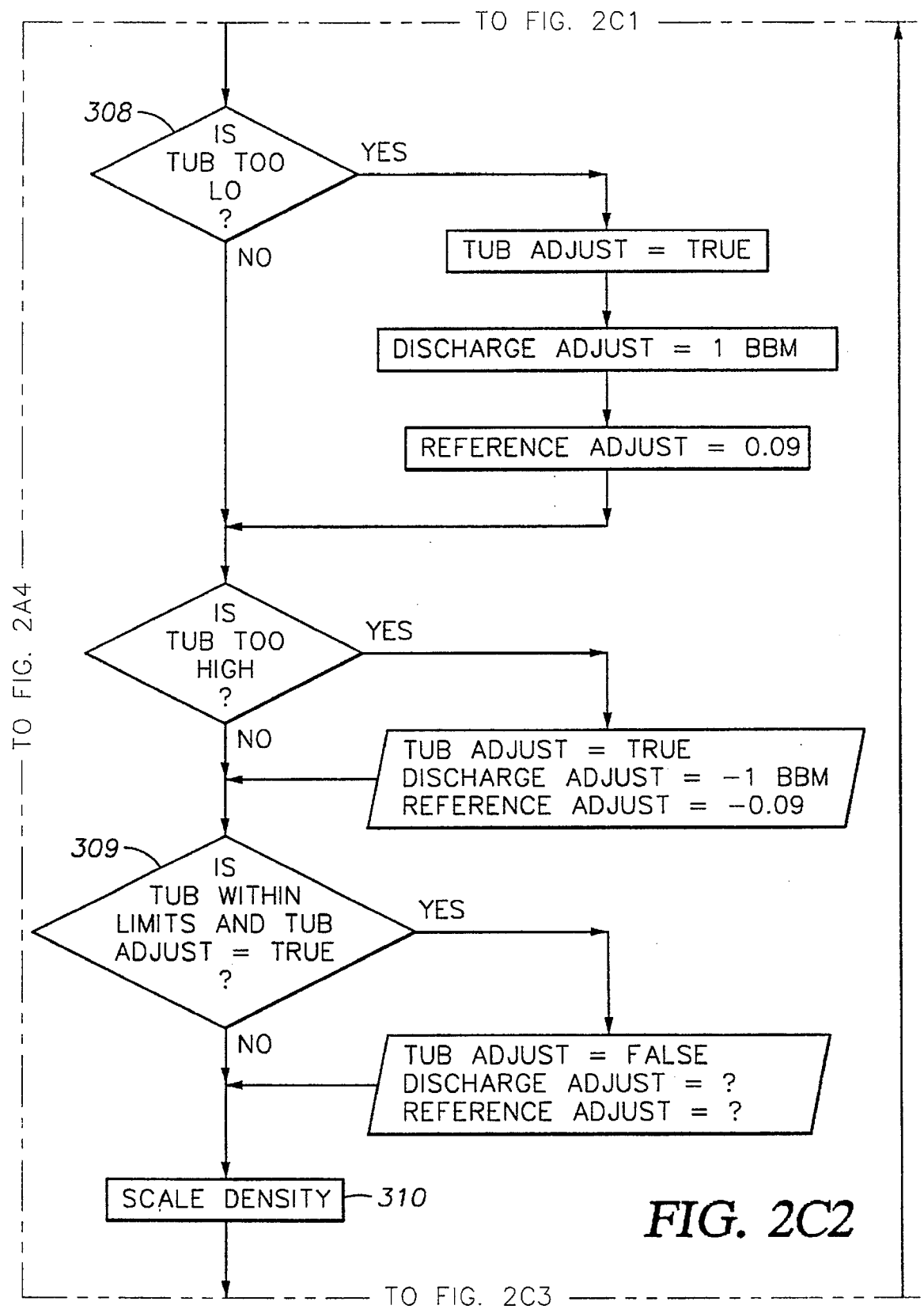
FIG. 2C2

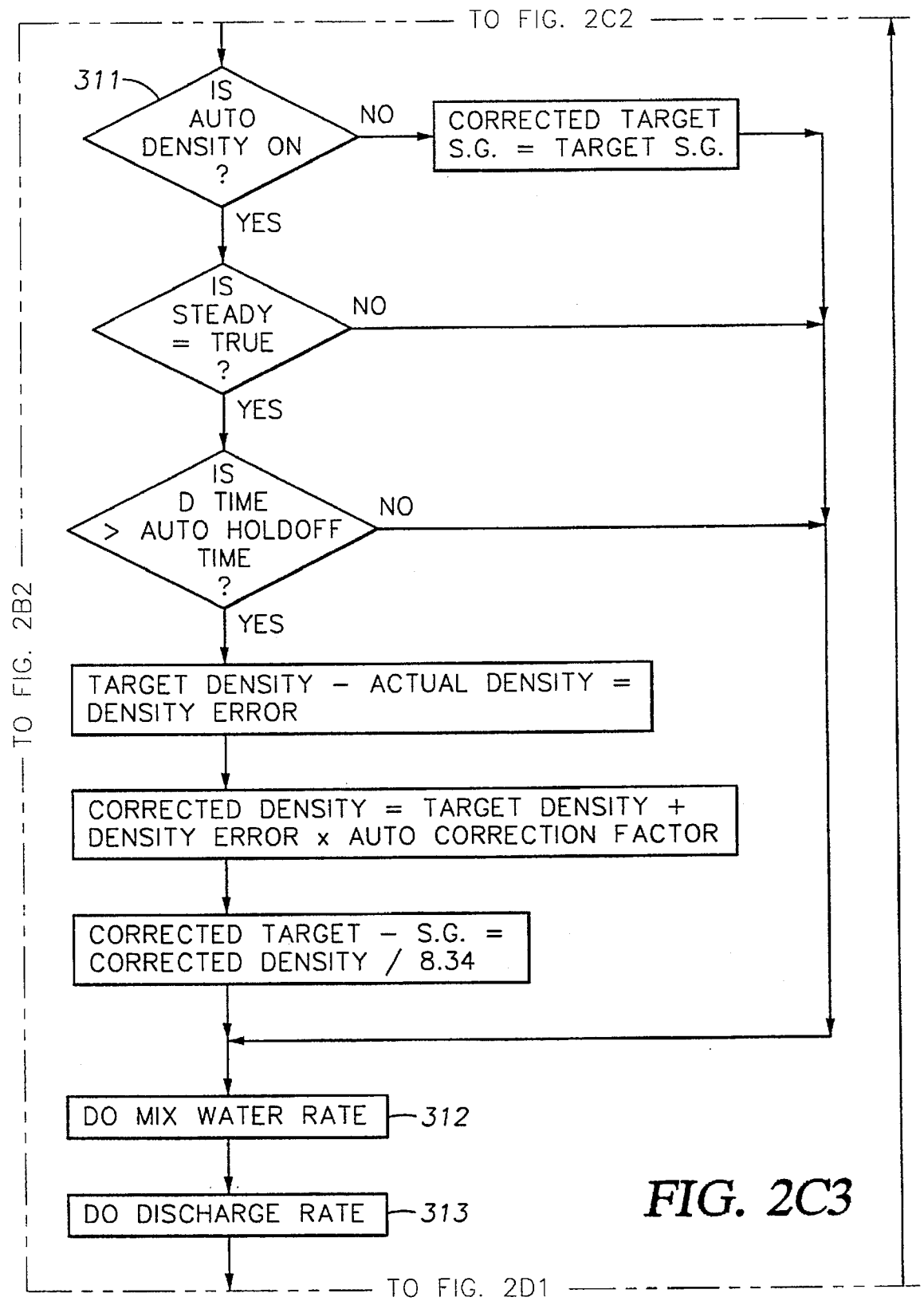
FIG. 2C3

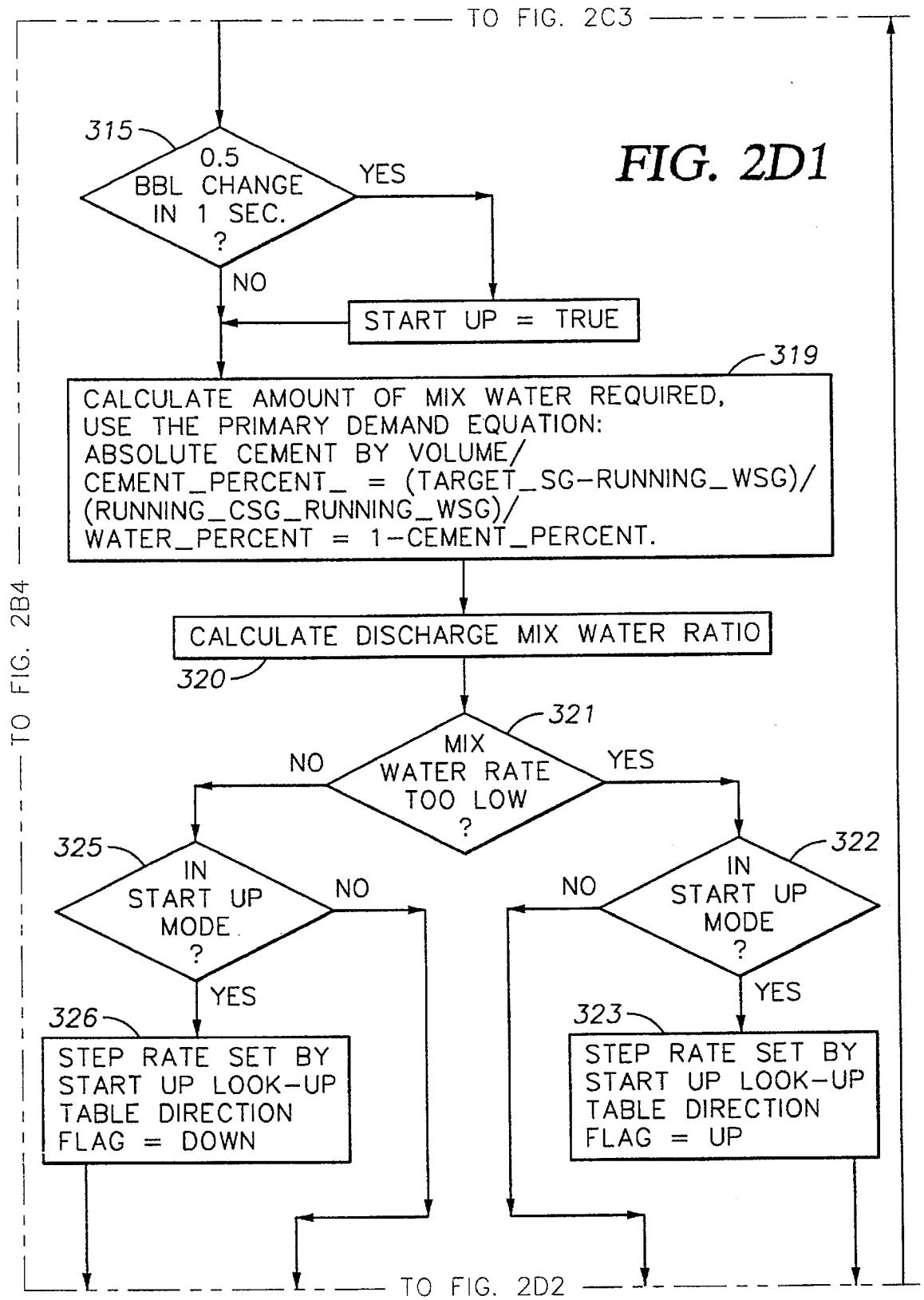

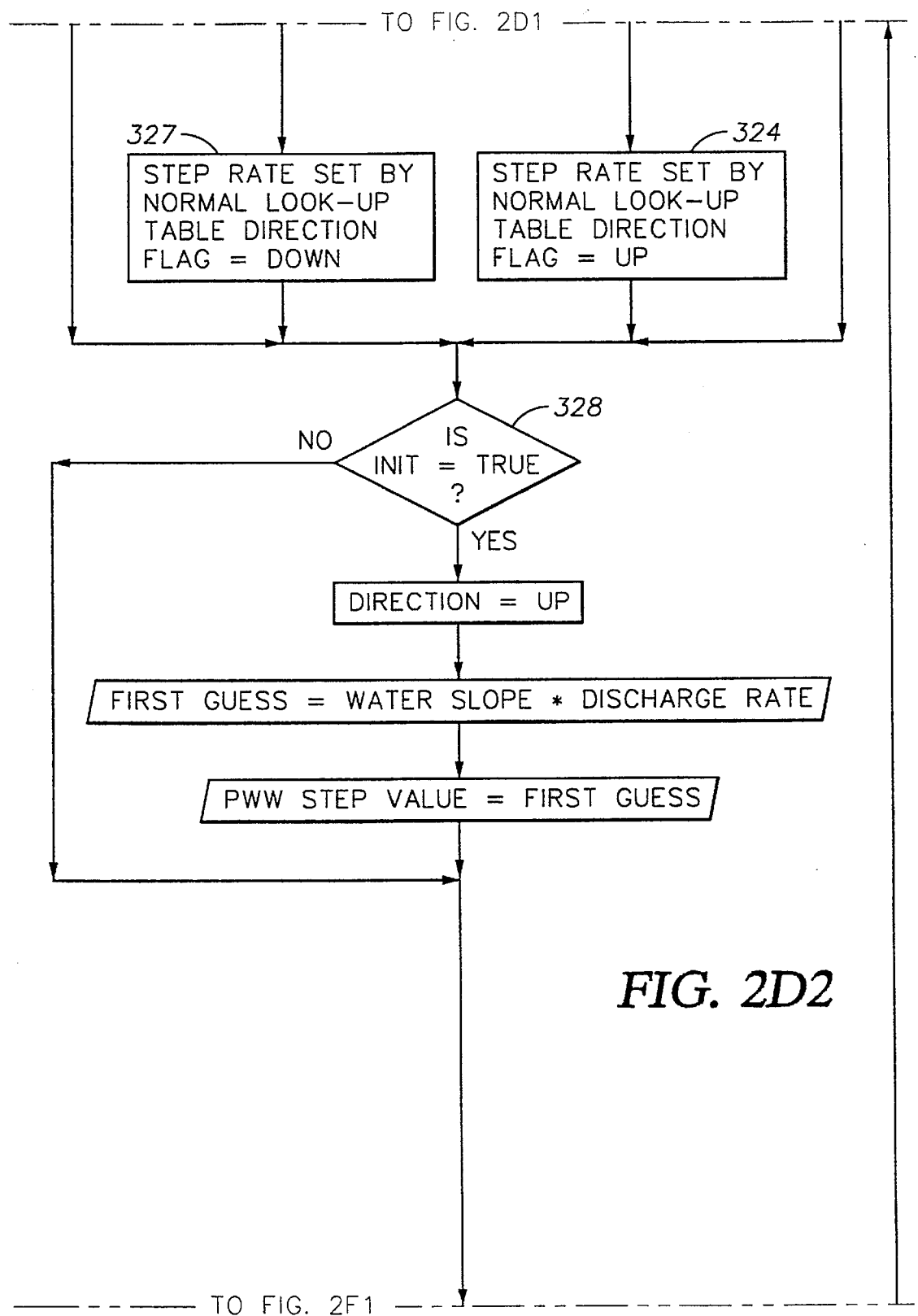
FIG. 2D2

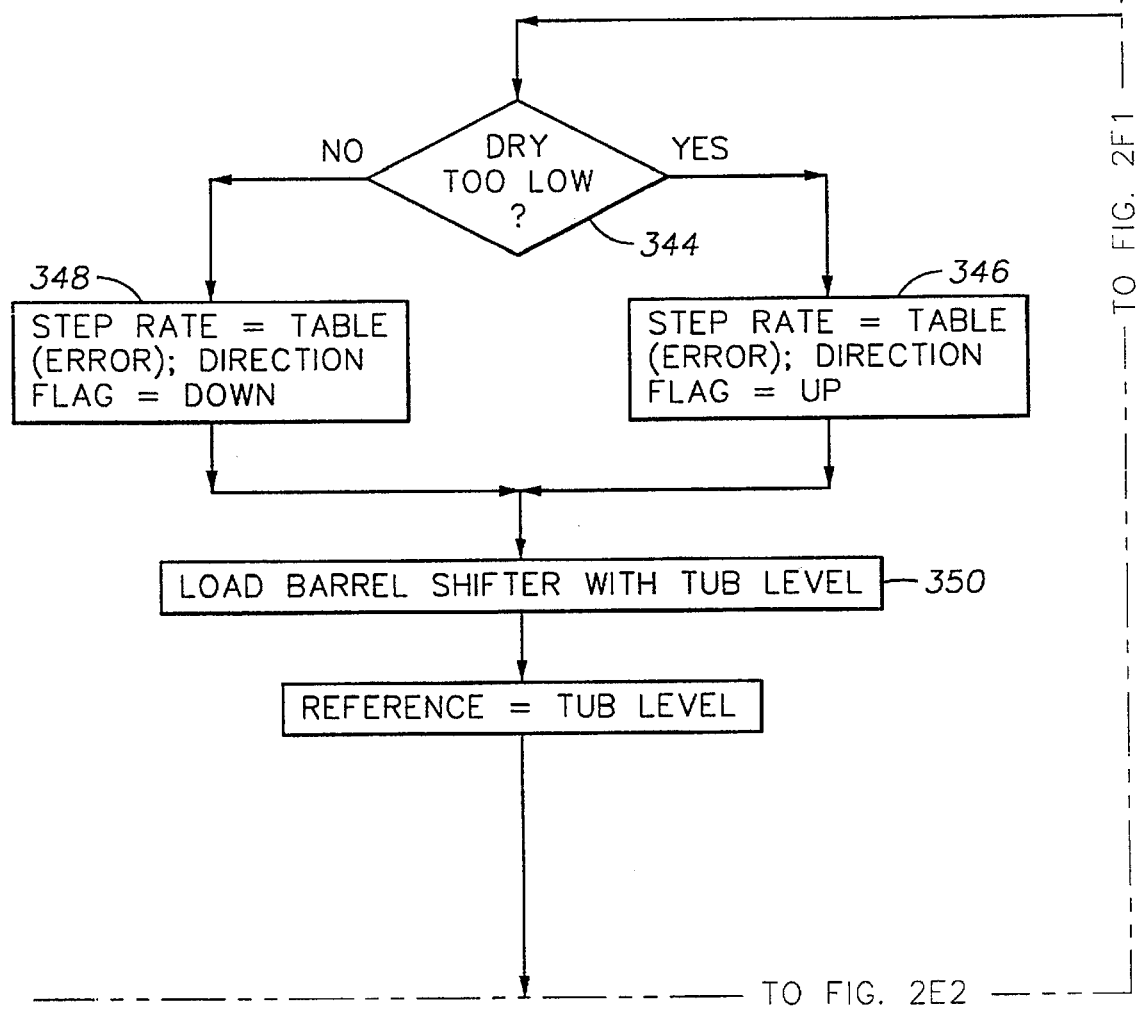
FIG. 2E1

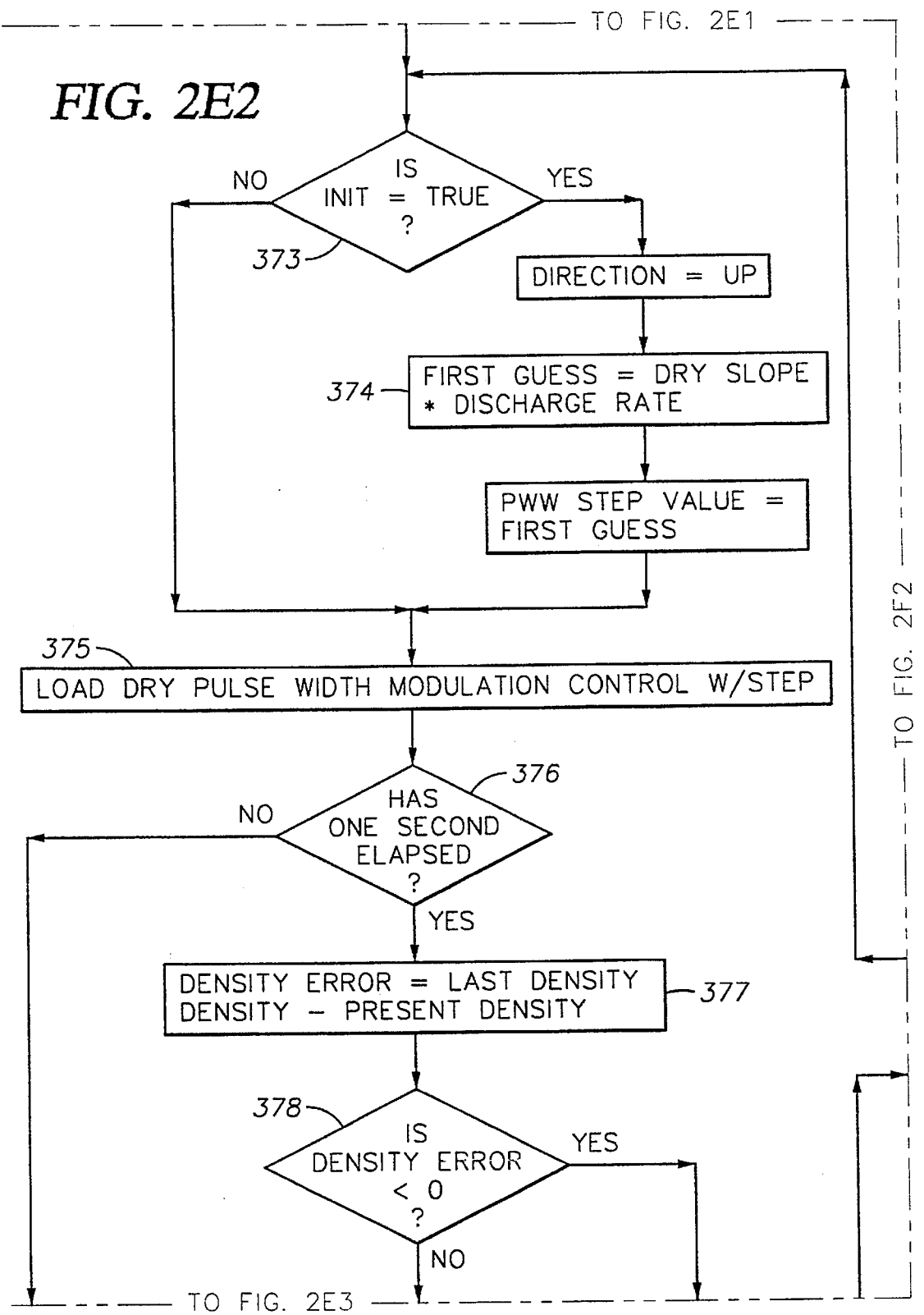
FIG. 2E2

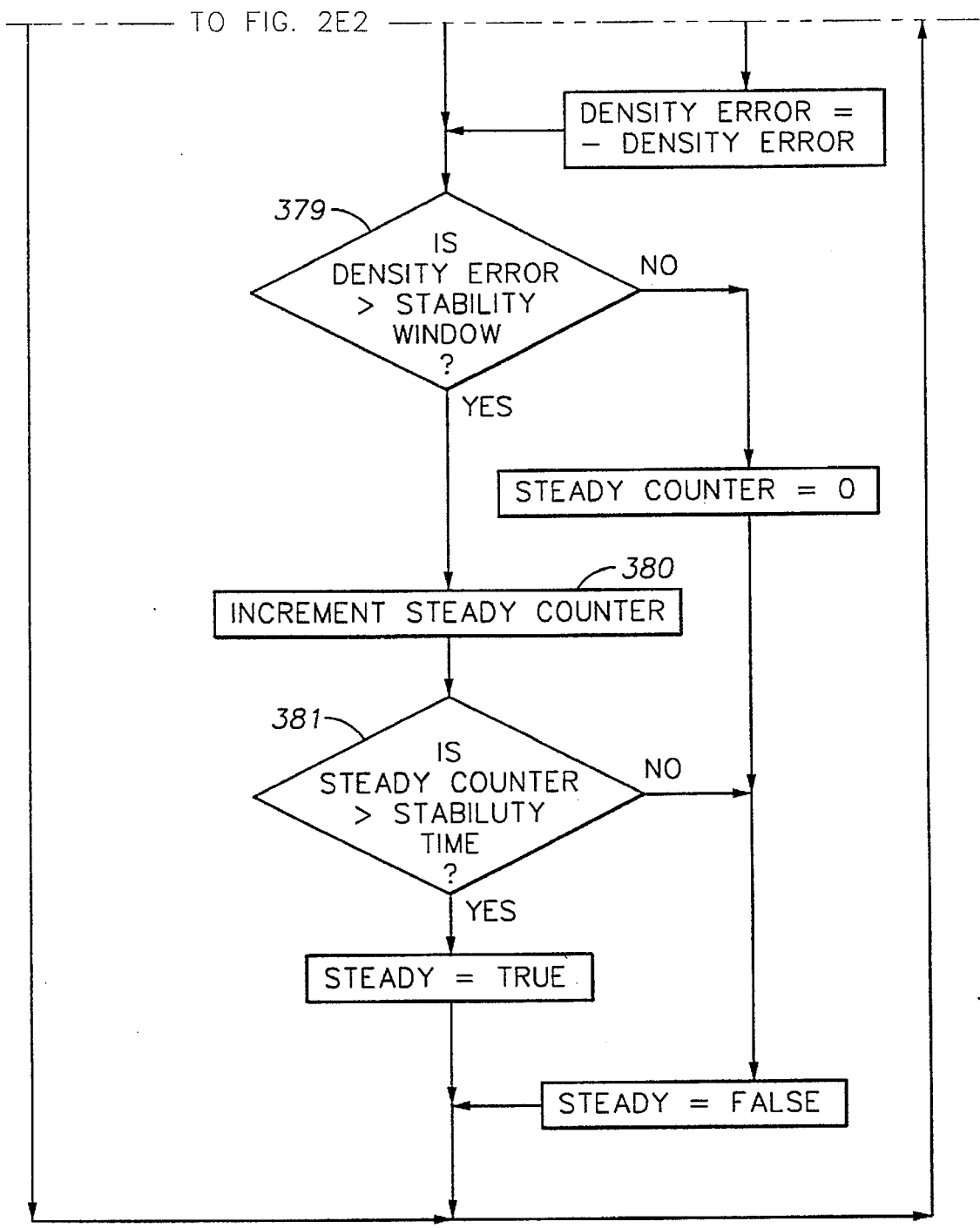
FIG. 2E3

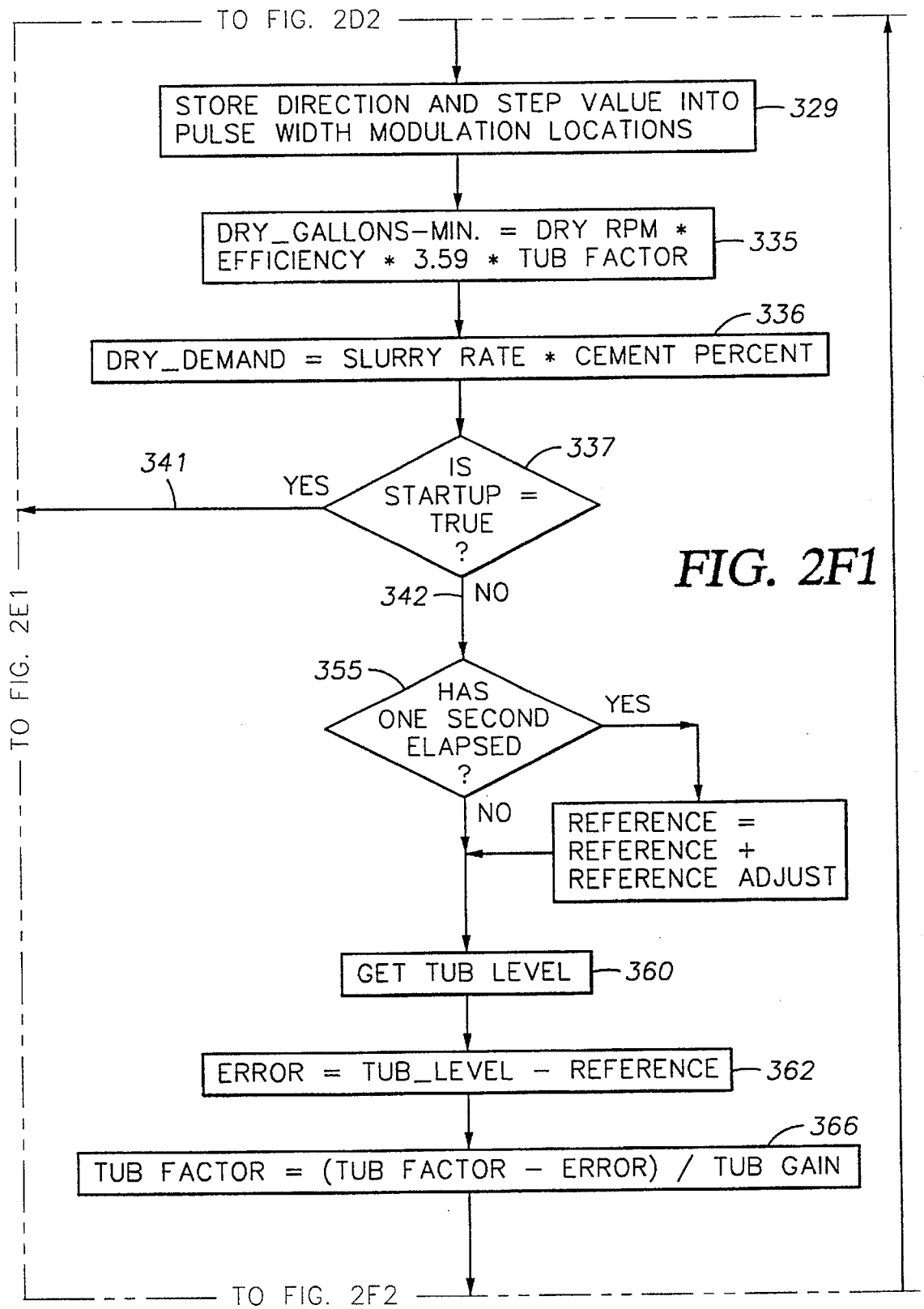
FIG. 2F1

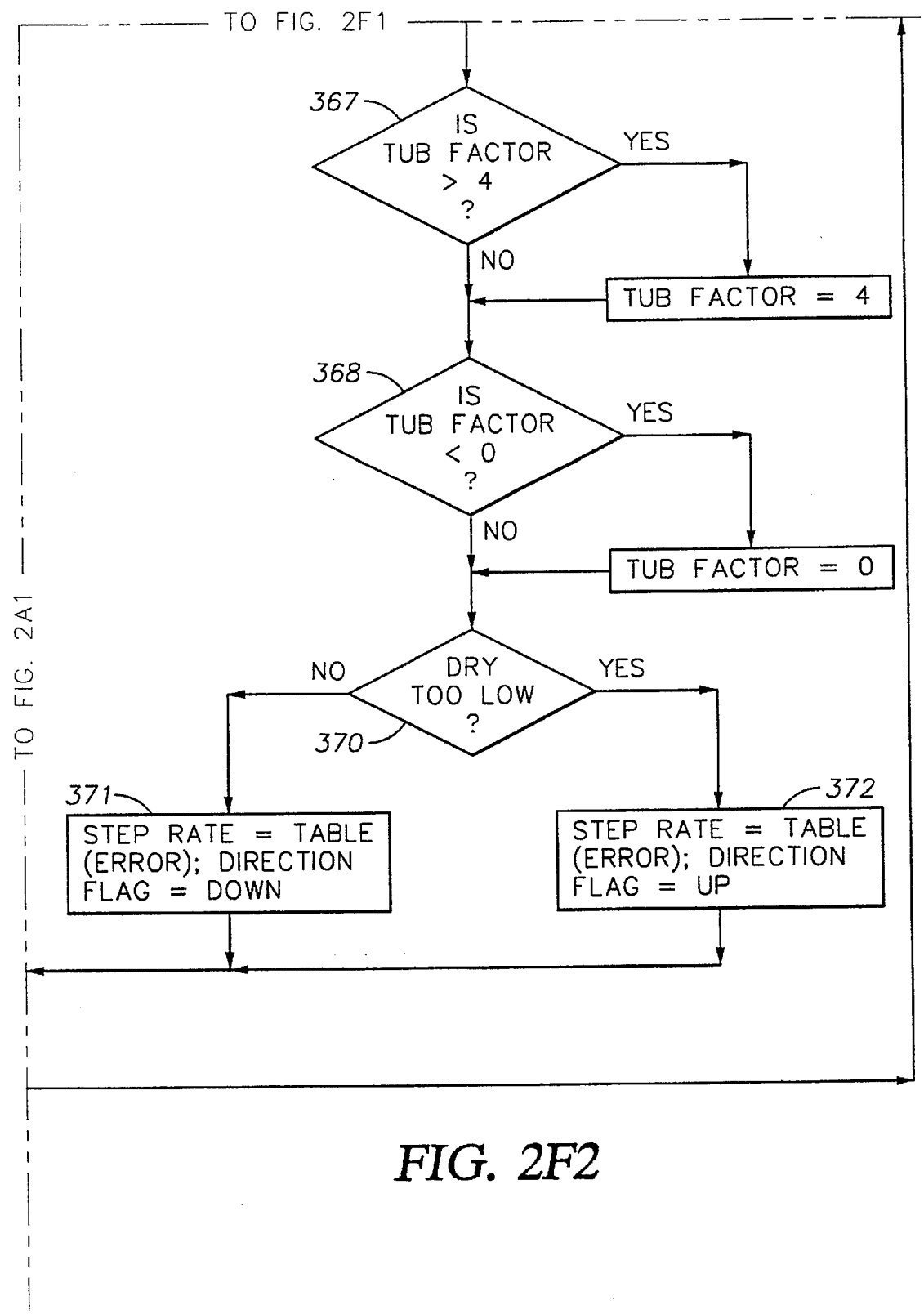
FIG. 2F2

AUTOMATIC CEMENTING SYSTEM WITH IMPROVED DENSITY CONTROL

This invention is a continuation-in-part of co-pending U.S. Ser. No. 08/178,659 filed Jan. 7, 1994, which was a continuation-in-part of now abandoned U.S. Ser. No. 07/969,944, filed Oct. 30, 1992, which was a divisional application of U.S. Ser. No. 07/389,923, filed Aug. 2, 1989 (now U.S. Pat. No. 5,281,023). This invention is also a continuation-in part of co-pending U.S. Ser. No. 08/308,477, filed Sep. 19, 1994, which is a file wrapper continuation of now abandoned U.S. Ser. No. 07/969,944, filed Oct. 30, 1992.

BACKGROUND OF THE INVENTION

The invention disclosed herein relates generally to an apparatus and method for obtaining a slurry with a desired density during a continuous-mixing operation. More particularly, the invention relates to an automated system for automatically controlling the density of a cement slurry with a very high degree of precision for use in well completions.

Systems for mixing dry cement with water are well known in the art. Typically, cement mixing for large jobs is either done by batch-mixing or by continuous-mixing. A batch-mixing operation occurs when the ingredients are mixed in a large tank or blender to obtain the entire volume of cement slurry before the start of the job. A continuous-mixing job, conversely, is an operation in which the ingredients are continuously mixed during the course of the job to produce a slurry for immediate use. The advantages of batch-mixing cement is that the density can be controlled very accurately. The disadvantage is that batch-mixing may prove to be impossible or impractical on large jobs in which a large volume of cement slurry must be generated. Because the slurry is premixed in a batch job, a blender or tank must be provided that is large enough to hold all of the slurry to be used on that particular job. Continuous mixing alleviates this problem, in that the slurry is mixed "on the fly" in a relatively small mixing chamber and is used immediately.

One problem, however, with continuously mixing the slurry is that it is very difficult to control the density of the slurry with any degree of precision because ingredients are constantly being added and slurry is constantly being discharged. As a result, it is common to have fluctuations in slurry density during continuous-mix operations. In certain applications, cement density fluctuation can cause severe problems. One example where cement density fluctuations are particularly undesirable is in cementing operations for casing a wellbore. The density of cement is especially critical for such cementing operations.

Cement is used in wells to secure casing in place in a wellbore to "complete" the well. The purpose of the cement is to seal and block various zones between the casing and the wellbore. Special additives may be mixed with the cement to alter specific properties of the cement, as required by the wellbore and casing characteristics and relationships. A general overview of cementing casing may be found in Skinner, D. R., *Introduction to Petroleum Production*, Volume I, Chapter 4: Well Completion (Gulf Publishing Co. 1981), and in Moore, Preston L., *Drilling Practices Manual*, Chapter 16 (PennWell Publishing Co. 1974).

Several terms commonly are used in cementing operations, as follows:

Cement Slurry refers to the mixture of dry or powdered cement and water that is injected or pumped into the wellbore;

Slurry volume refers to the volume of slurry that is obtained when a given volume of dry cement is mixed with a given volume of water; and Slurry density is the weight of a given volume of mixed slurry, and typically is measured in terms of pounds per gallon (also referred to as "PPG");

Different cements cure in different ways; for example, some cements expand as they cure, while others shrink. During the curing process, cement generally increases in temperature. Some cement mixtures will become weak or increasingly permeable as a result of this increase in temperature during the curing process. Because the heat of the earth increases at greater depths, degradation of the cement becomes more pronounced as the depth of the wellbore increases if cement is used downhole in wells.

The cement and water typically are mixed on site during a cementing operation because most wells are located in remote locations where it is impractical to use large mixing tanks. Such an application commonly is referred to as a continuous-mixing job. The materials used in the cement are usually prepared dry and transported to the well site, where it is mixed with liquid or "mix water" and pumped into the well. Various dry or liquid additives also may be added to either the mix water or to the dry cement as desired to alter the properties of the cement slurry. The cement slurry normally is pumped in liquid form into a wellbore by pumping the slurry down the interior of the casing and forcing the slurry to flow from the bottom of the casing back upward between the casing and the wellbore. After the cement has been pumped into the wellbore, it must be allowed to cure for a certain period of time that can vary between 12–72 hours.

By evaluating the wellbore and formation characteristics, a person skilled in the art can determine with a good deal of precision the preferred cement density to use during the cement job to most effectively protect the casing and separate producing formations. If a cement slurry density could be maintained within a tight tolerance of ±0.1 lbs/gallon (PPG) of the preferred density, the probability of a successful cementing operation would be much higher. Some authors have stated that proper mixing of the cement slurry is critical to successful completion of a cementing job on a well, and have proposed systems to alleviate this problem with density control in continuous-mixing operations. See e.g. Galiana, et. al., "Cement Mixing: Better Understanding and New Hardware," *Oilfield Review*, (April 1991); Hitt, et. al., "Process Control of Slurry Density: Impact on Field Performance of Slurry Density," presented at the Society of Petroleum Engineers' Production Operations Symposium held in Oklahoma City, Okla., Apr. 7–9, 1991; O'Neill, et. al., "New Slurry Mixer Improves Density Control in Cementing Operations," presented at the Society of Petroleum Engineers' Latin America Petroleum Engineering Conference held in Rio de Janeiro, Oct. 14–19, 1990; Wienck, et. al., "Automatic Control of Bulk Cement Tank Levels," presented at the 24th Annual Offshore Technology Conference in Houston, Tex., May 4–7 1992; and Stegemoeller, et. al., "Automatic Density Control and High Specific Mixing Energy Deliver Consistent High-Quality Cement Slurries," presented at the 24th Annual Offshore Technology Conference in Houston, Tex., May 4–7, 1992.

Unfortunately, the prior art continuous-mix cementing systems have been unable to guarantee the density of the cement slurry within an acceptable tolerance level. Most prior art cementing systems are subject to a wide fluctuation in cement slurry density. See the discussion in Galiana, et.

al., "Cement Mixing: Better Understanding and New Hardware," *Oilfield Review,* (April 1991). Even the systems developed more recently have encountered difficulty in obtaining a slurry density within ±0.1 lbs/gallon. Id. One of the reasons for this variance is that the meters and valves used in the mixing and density control systems typically are designed to be within a predetermined accuracy. Consequently, a certain amount of error is common in most meters. This is especially true with respect to the dry cement delivery system. Compounding this problem is the fact that many density control systems attempt to obtain a desired density by fixing the amount of dry cement to be delivered, while adjusting the rate at which water is input based upon feedback from a density sensor. See e.g. Stegemoeller, et. al. "Automatic Density Control and High Specific Mixing Energy Deliver Consistent High-Quality Cement Slurries," presented at the 24th Annual Offshore Technology Conference in Houston, Tex., May 4–7, 1992. The meters and valves associated with the dry cement delivery system have a relatively large error associated with them that makes any control system suspect that is based upon setting the delivery of dry cement to a fixed level. This error results from a number of factors such as the tendency of the dry cement to coagulate. Because of the difficulty in handling and supplying dry cement during a cementing operation, it is very difficult to maintain a constant slurry density.

Because of the inherent inaccuracy in all of the meters and valves typically used in an automatic density system, and especially those related to the dry cement delivery system, it is extremely difficult to design a system that can very accurately and precisely control the density of a cement slurry. It is an object of the present invention to automatically control the density of the cement slurry obtained in a continuous-mixing application to within ±0.1 lbs/gallon (PPG) of the desired density for cementing operations that is relatively independent of the error inherent in the meters and valves used in the system and especially those related to the dry cement delivery system.

SUMMARY OF THE INVENTION

The present invention comprises a system and method for automatically and precisely controlling the density of a cement slurry. The invention preferably includes a fresh water input device, such as a pump or a valve, and a dry cement delivery system, supplying mix water and cement, respectively, to a mixing chamber. The mixing chamber combines the mix water and cement to obtain a cement slurry that is discharged through a discharge line to a well or other desired location. The rate and amount of slurry being discharged is measured by a discharge flow meter. The input mix water line includes a flow meter, and the dry cement delivery system includes a valve or other device for regulating the amount of dry cement delivered to the mixing chamber. Additionally, the mixing chamber preferably includes a level sensor for monitoring the level of the slurry in the mixing chamber.

The system controller also preferably receives as inputs from an operator (1) the desired or target slurry density in pounds per gallon (PPG); (2) the density of the input mix water in specific gravity units; and (3) the absolute density of the dry cement, in specific gravity units.

The discharge line of the system preferably includes a discharge valve and a discharge flow meter. The discharge flow meter provides an indication of the rate at which slurry is being discharged. With this information, and the information provided by the operator, the controller determines the percent by volume of dry cement in the cement slurry. In other words, the controller determines how much dry cement is leaving the system as part of the cement slurry. Once the percent by volume of dry cement is known, the controller then determines the percent by volume of liquid in the cement slurry. After the controller determines the percent by volume of liquid in the slurry, the controller calculates the amount of liquid that must be supplied to the system through the input line to maintain the level in the mixing chamber at a relatively constant level. This calculation is made by multiplying the discharge rate by the percent by volume of liquid in the slurry. In this manner, the controller insures that the same amount of liquid is flowing into the system as is flowing out as a component of the cement slurry. Once the controller determines the proper input rate of liquid into the system, the controller adjusts the input pump or input valve to provide the mix water at the required rate. The input flow meter is used as feedback to bring the input water device to the proper speed or position.

After the input device is set at the proper speed or position, the controller sets an approximate speed or position for the valve to control the delivery of dry cement into the mixing chamber. The controller uses the percent by volume of cement in the slurry and the discharge rate, together with other factors, to determine a theoretical quantity of dry cement that should be delivered to the mixing chamber. The controller then calculates a modified dry demand quantity. The modified dry demand is determined first by taking a real time measurement of the level of the slurry in the mixing chamber and comparing that level to a reference level that is determined by the output from a barrel shifter in the controller. The controller then generates an error factor based on the difference between the real time level and reference level. The controller then multiplies the error factor by the theoretical dry demand quantity to generate the modified dry demand quantity. The controller then compares the modified dry demand quantity with the actual measured quantity and adjusts the valve as necessary to modify the delivery of dry cement.

The mixing chamber preferably comprises a divided tub, with Chambers A and B, for receiving water and dry cement, with the discharge line connected to the chamber B. In addition, the level sensor is preferably provided to monitor the change in slurry level in chamber B. In this embodiment, the controller continues to adjust the speed or position of the dry cement control valve as described above such that the level of slurry in chamber B remains constant.

The invention also preferably includes a recirculation line to permit the density of the slurry to be brought to the desired density before it is discharged, and before automatic operation begins. The recirculation line includes a density meter for measuring the density of the cement slurry and for providing an indication of that density to the system controller.

These and other advantages and details of the invention will become apparent from a review of the Detailed Description which follows.

BRIEF DESCRIPTION OF THE DRAWINGS

For a detailed description of the preferred embodiment of the invention, reference will now be made to the accompanying drawings, wherein:

FIGS. 2A–2F illustrates a flow chart of the operation of the ACS system of FIG. 1.

DESCRIPTION OF THE PREFERRED EMBODIMENT

Figure 1:
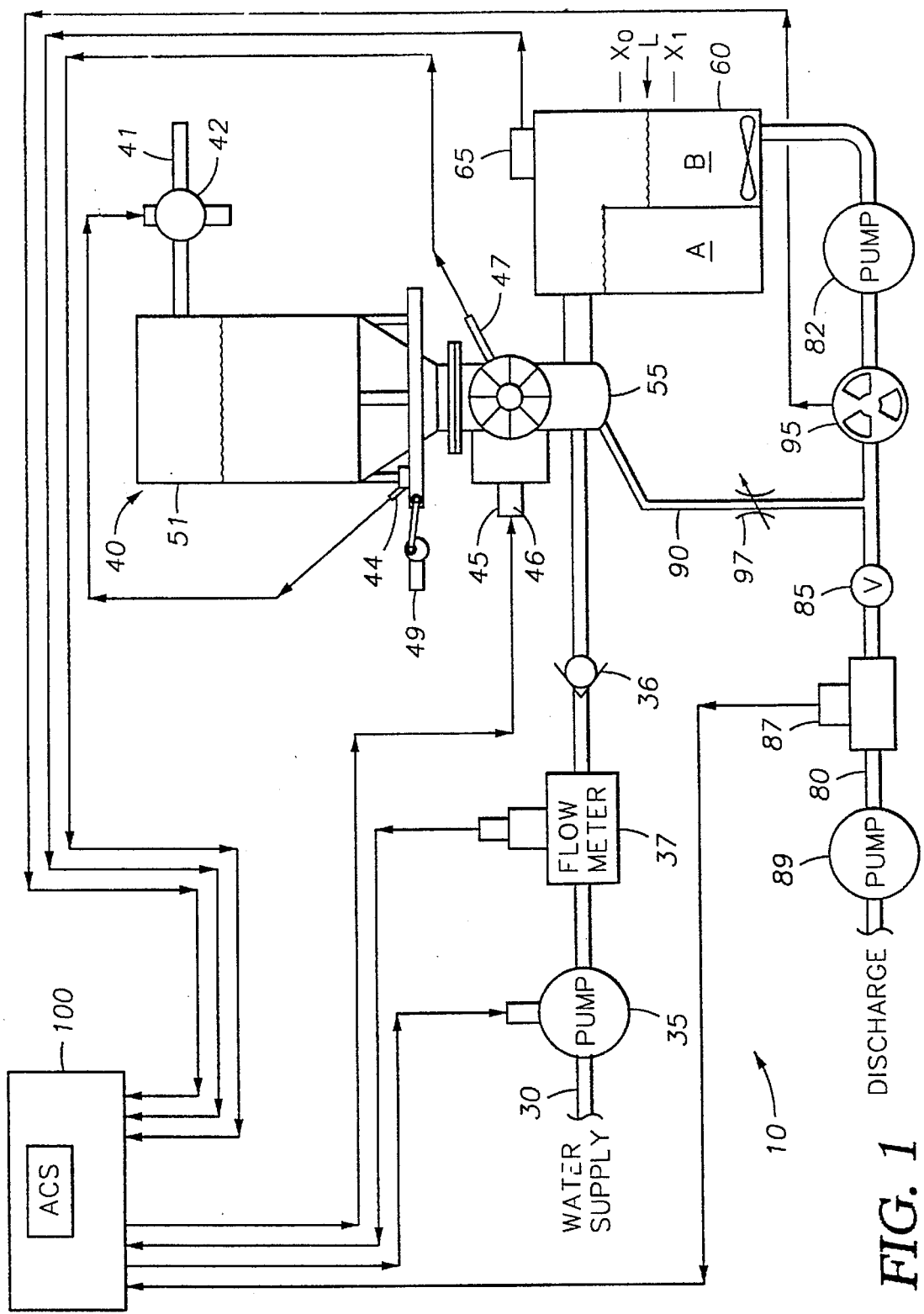
FIG. 1 is a schematic illustration of the configuration of the Automatic Cementing System ("ACS") of the preferred embodiment.

Referring now to FIG. 1, the Automatic Cementing System ("ACS") 10 constructed in accordance with the preferred embodiment generally comprises an input (or "mix") water supply line 30, a dry cement source 40 for supplying dry cement, a mixing chamber 60 for mixing dry cement and water, a cement slurry discharge line 80, a recirculating slurry line 90, and a system controller 100 for receiving output signals from the various system components and for providing control signals to regulate the operation of the ACS system.

The input water supply line 30 preferably provides mix water (or other base liquid) to the mixing chamber 60 for mixing with the dry cement from source 40. The water supply line 30 preferably includes a fresh water pump 35, an input flow meter 37, and a mixing bowl 55 for receiving dry cement from hopper 51 of source 40. Water pump 35 is preferably a speed-controlled centrifugal pump. Similarly, mixing of the cement and water can take place in a jet mixer instead of a mixing bowl 55. The water/cement mixture preferably flows from mixing bowl 55 (or jet mixer) into mixing chamber 60.

In the preferred embodiment, the input flow meter 37 comprises mag-type flow meter such as, for example, Model No. 1ODX3311AAL12P1A7BA11Z2X1AABH1 manufactured by Fischer & Porter Company. The pump 35 preferably connects electrically to the system controller 100 for receiving control signals. The input flow meter 37 preferably connects electrically to the system controller 100 and provides an electrical signal to the controller 100 that is indicative of the flow rate of mix water into the mixing chamber 60. Preferably, the input flow meter has an accuracy of 0.50%. The water supply line 30 preferably connects to a fresh water supply (not shown), which may be mounted on a truck, or which may comprise a water tower or other available water source capable of generating the required volume at the required rate.

Dry cement source 40 for providing dry or powdered cement to the mixing chamber 60 preferably comprises a hopper 51 that includes a supply conduit 41, a weight sensor 44, a valve 45 in combination with a valve sensor 47, and manual, air-operated fluidization pads 49. As one skilled in the art will immediately realize, many other delivery systems may be used without departing from the principles of this invention. For example, a vibrator may be used instead of the fluidization pads to insure uninterrupted flow of cement into the valve 45. The hopper 51 receives the dry cement through conduit 41, which connects the hopper 51 to a source of dry cement (not shown). In accordance with conventional techniques, dry additives may be combined with dry cement either before or during the mixing operation. In addition, to insure a good flow of dry cement through conduit 41, the dry cement preferably is blown through conduit 41. The conduit 41 preferably includes a cement inlet control valve 42. Cement inlet control valve may be satisfactorily operated either manually or by an electronic controller, such as a programmable logic controller ("PLC"). As noted, the hopper 51 also preferably includes a weight sensor 44 for determining the amount of cement in the hopper 51 by weight. Weight sensor 44 which preferably comprises a load cell, and is preferably electrically connected to the controller, such as a PLC, operating the cement inlet control valve 42.

Valve 45, or other suitable regulating device, controls the amount of cement that is delivered to mixing bowl 55. In accordance with conventional techniques, the dry cement is dropped on top of the water being injected through input line 30, at mixing bowl 55. Although not required in the preferred embodiment, a jet nozzle (not shown) may be provided on the input line 30, just upstream from the mixing bowl 55. The cement/water mixture then flows into the mixing chamber 60 where further mixing occurs. Other alternative mixing arrangements can be used, however, without departing from the principles of the present invention.

In the preferred embodiment, the valve 45 comprises a rotary valve, with a controller 46 that can be externally regulated. The controller 46 of valve 45 preferably connects electrically to the system controller 100 for receiving electrical signals that are used to regulate the speed (or position if the valve is not a rotary valve) of valve 45 in order to control the rate at which dry cement is delivered to the mixing chamber 60. Sensor 47 preferably comprises a rotary valve speed sensor for measuring the speed of rotary valve 45. In addition, sensor 47 preferably connects electrically to the system controller 100 to provide an electrical signal to system controller 100 that is indicative of the speed (or position) of valve 45. An example of a valve 45 suitable for use in the present invention is Model No. OBRV-18 as manufactured by Semco, Inc. Sensor 47 may be, for example, Model No. 41 as manufactured by Newport Electronics Incorporated. As will be understood by one skilled in the art, various other valves, controllers and sensors could be used without departing from the principles of the present invention. For example, a slide gate may be used in place of a rotary valve. The position of the slide gate then would be monitored to determine the size of the opening through which cement could pass.

The mixing chamber 60 receives mix water from the input supply line 30 and dry or powdered cement from the dry cement hopper 51, and mixes the water and dry cement to obtain a cement slurry. Other chemicals or additives also may be supplied to the mixing chamber 60, as desired. Mixing chamber 60 preferably includes two divided chambers, Chamber A and Chamber B, to define a weir divider for removing entrained air according to well known principles. Chamber B includes a mixer for mixing the cement and water.

The mixing chamber 60 preferably is constructed so that the cement and water are discharged into Chamber A when it is first mixed. As Chamber A becomes full, the slurry pours over into Chamber B. The discharge line 80 preferably connects to the lower side of Chamber B. In the preferred embodiment, a tub level sensor 65 is provided for measuring the slurry level of Chamber B. This tub level sensor 65 preferably comprises a sonic level sensor such as Model No.

PCUB30M72AI as manufactured by Electro Corporation, and Chamber B is constructed so that it is relatively deep, while having a relatively small cross-section area. Obviously, other dimensions could also be used without departing from the principles of the present invention. By constructing Chamber B with a relatively small cross-section, changes in slurry level in Chamber B will be more pronounced, and thus will be more easily detected by the level sensor 65.

The discharge line 80 preferably receives cement slurry from the lower side of Chamber B and supplies the slurry to the well site. The discharge line 80 includes a discharge flow meter 87 for measuring the rate at which slurry is discharged, a manually controlled discharge pump 82, and a discharge valve 85. In the preferred embodiment, the discharge flow meter 87 comprises a non-intrusive sensor, such as a magnetic flow meter, capable of an accuracy within 0.5%. A suitable flow meter 87 is Model No. 10DX3311AAL15P1A78A11Z2X1AABH1 as manufactured by Fischer & Porter Company. The discharge flow meter 87 preferably connects electrically to the system controller 100 to provide an output signal that is indicative of the flow rate of cement slurry through discharge line 80. The discharge pump 82 preferably comprises a centrifugal pump that is manually controlled by the operator. One or more triplex pumps 89 also may be provided downstream in the slurry discharge line 80 in accordance with conventional techniques. The triplex pumps are manually regulated by the operator and normally are run at various speeds.

The discharge valve 85 works in conjunction with recirculation line 90. When discharge valve 85 is closed, cement slurry is forced to flow through the recirculation line 90. The recirculation line 90 preferably connects between the discharge line 80 and the mixing bowl 55. The recirculation 90 preferably performs two separate functions. First, the recirculation line 90 enables the system to bring the cement slurry to the desired density before discharging begins. Second, during the time that cement is being discharged, the amount of slurry recirculated is regulated by the recirculation valve 97. This recirculated slurry adds energy to the mixing process in the mixing bowl 55 and tends to dampen slurry density fluctuations in the mixing chamber 60. The recirculation valve 97 is a throttling type valve and regulates the amount of slurry recirculated. It is used in conjunction with pump 82, which always runs at full speed, to control the discharge pressure in line 80. In the preferred embodiment, a nuclear density meter 95, which preferably has an accuracy within ±0.1 PPG for precisely measuring the density of the cement slurry, is preferably located immediately downstream from pump 82 and before the recirculation line connection. A suitable density meter 95 is Model No. SGD-0-4 as manufactured by the Texas Nuclear Division, Ramsey Engineering Company.

Alternatively, one skilled in the art will understand that the present invention can be used without a recirculation line or alternatively, no density meter need be included. If no density meter is included, then the density of the cement slurry may still be obtained through the use of the input flow meter and discharge flow meter, as disclosed in pending application, U.S. Ser. No. 07/969,944, the teachings of which are incorporated herein. Alternatively, the density of the slurry may be measured by taking and testing samples.

The system controller 100 preferably comprises a microprocessor-based unit for orchestrating the operation of the ACS system. In the preferred embodiment, Motorola's 68HC11 is used as the microprocessor. The controller 100 preferably includes an input, such as a keyboard or operator panel, through which system parameters can be input by an operator. The controller 100 also preferably includes an output for displaying to the operator certain critical system parameters. Preferably, the input and output of the controller 100 are designed so that the operator is guided by a menu driven display to insure that all necessary information is provided by the operator.

Also in the preferred embodiment, the system controller 100 may include one or more read-only memory (ROM) units for storing look-up tables that are loaded into the controller 100 prior to the start of a cement job. As explained in more detail below, these look-up values are used to correlate step rates with error values for both the mix water rate and the dry cement delivery rate. Thus, for example, if the desired mix water rate is different than the actual mix water rate, as measured by input flow meter 37, an error value is calculated by controller 100 based upon the difference. The controller 100 then accesses the look-up table, which preferably is stored on ROM, to determine the appropriate step rate by which the mix water rate should be changed. The step rate, therefore, determines how quickly the rate increases or decreases. A similar look-up table is also used for the dry cement delivery system to determine the step rate of the dry cement. In an alternative embodiment, another look-up table may be provided that correlates the delivery characteristics of the hopper for a given speed (or position) of the valve 45. Thus, by accessing this look-up table, the system controller 100 can approximately determine the quantity of dry cement that will be delivered if the valve operates at a given speed or is set at a particular position. This feature is especially useful if an automatic start-up is desired.

The system controller 100 preferably connects electrically to at least the following devices: (a) the input flow meter 37; (b) the dry feeder speed sensor 47; (c) the sonic level sensor 65; (d) the density meter 95; and (e) the discharge flow meter 87, for receiving electrical output signals from each of these sensors. These signals from each of the sensors are processed as described more fully below to permit automatic operation of the ACS.

The system controller 100 also preferably connects electrically to at least the following: (a) the fresh water device 35; and (b) the valve controller 46, for providing output control signals to each of these components. The controller 100 automatically adjusts the speed or position of the fresh water device 35 and the valve 45 to fine-tune the density of the slurry, as will be described more fully below.

I. OPERATION OF SYSTEM CONTROLLER

Referring now to FIGS. 2A–2F, the operation of the system controller 100 will be discussed in accordance with the preferred embodiment. In the preferred embodiment, the system controller 100 provides a menu display to the operator to guide the operator through both the main menu and through each step of the options. As shown in FIG. 2, the system controller initially provides the operator with three options as part of a main menu: (1) enter job data into the ACS (Job Entry Data); (2) calibrate and set-up the ACS (Calibrate & Setup); or (3) run the ACS (Run). The source code for the preferred programming of the controller 100 is attached in the Appendix.

1. Entering Job Data

If the operator selects the Job Entry Data selection on the main menu, the controller will ask in step 202 whether the operator wishes to clear all stage data, or whether the operator wishes to edit existing data. It should be understood that the operation of the ACS could include a number of stages, with a stage being defined as any change in operating conditions, including a change in the cement slurry's target density, a change in the density of the input fluid, or a change in the density or type of dry cement that is used. Thus, for example, if it is desired to change from a target slurry of 16.0 PPG to 16.3 PPG, a different stage would be involved. Similarly, if it was desired to add liquid additives to the input water after operations had begun, thus changing the density of the input liquid, a different stage would be defined. Changing from one stage to the next could be preprogrammed into the system controller 100 by, for example, specifying the volume (either input or discharge) at which the stage was to change, or could be done manually by having the operator designate a change in stage by activating a switch. In either instance, the stage parameters could be preprogrammed into the controller 100.

The first display that will appear to the operator after the stages are cleared, or if the edit option is chosen, is a request, in step 204, to input the desired or target density, preferably in pounds per gallon (PPG), for the cement slurry for that particular stage. As one skilled in the art will realize, other measurement units may be used without departing from the principles of this invention. In the preferred embodiment, an increment and decrement switch is used to set the desired setting. Obviously, other input procedures could be used without departing from the scope of the present invention. After the target density for the cement slurry is entered for a particular stage, the controller prompts the operator in step 206 to enter the specific gravity of the input fluid for that particular stage, again through the use of the increment and decrement switches. The controller next requests in step 208 information regarding the dry cement specific gravity for that particular stage.

Once these three items are entered by the operator, the controller in step 210 asks the operator if there are other stages to be entered at this time. If there are, then the controller cycles back through the menus to obtain the necessary information. When all stages have been entered, the controller permits the operator to review the information entered, by stage, and make any necessary changes. When review is complete, the controller returns to the main menu which again is displayed to the operator.

2. Calibrating and Setting Up the System

At the beginning of the calibration routine, the operator can select whether he or she wishes to enable the Auto Density Trim function (211). By selecting and accepting "yes", the system controller will operate in auto density mode. If auto density is on and tune is on in step 201, then the operator cam adjust four constants which control the auto density feature's logic. These constants, as described in step 213 and following, are the: auto stability time, stability window, auto holdoff time, and auto correction factor. The auto stability time allows the operator to set how long the measured density must be within the stability window before setting the stability flag. Once the stability flag is set and the process is declared "steady", the auto holdoff time forces the process to wait for the specified holdoff time before performing any auto density calculations, as described in step 311. After the holdoff time expires, a corrected density factor is calculated to adjust the theoretical density to actual measured density. The auto correction factor is a multiplier with a value between 0 and 100% that allows the operator to adjust the amount by which the target density is corrected.

The next question asked of the operator in step 215 is if he or she wishes to change certain operating parameters or to calibrate the input mix water flow meter 37. For example, if the input flow meter 37 provides one hundred output pulses to signify to the controller 100 that 10 gallons/minute are flowing through the meter, the operator could recalibrate the controller to interpret the 100 pulses from the input flow meter to mean that 10.5 gallons/minute are flowing through the meter. The operator, therefore, can adjust the k factor of the input meter. Similarly, in step 217, the operator also can change the k factor of the discharge flow meter 87. This calibration feature enables the various sensors to be pretested and finely tuned for accuracy. In addition, if a new meter is substituted, the meter can be quickly and accurately calibrated through the use of this software option.

In step 219, the controller asks the operator if he or she wishes to change the settings of the valve 45 on the dry cement source. Three different parameters can be changed on the valve 45. The first parameter that can be changed is the maximum efficiency in step 220. The maximum efficiency represents the percentage efficiency of the dry cement valve at 5 RPM. Then the operator will be asked to input the minimum efficiency of the dry valve at 40 RPM. These two efficiencies affect dry calculations as the dry valve increases in RPM. Thus, this allows for correction of the dry valve delivery system as RPM increases. The last parameter is the dry valve speed k factor. The k factor allows the operator to enter a value which represents the number of pulses per revolution of the dry valve. This is necessary for accurate measurement of the dry valve RPM. All of these factors can be adjusted to fine tune the operation of the dry cement valve 45.

The controller 100 also asks the operator if it is necessary to adjust the density meter 95 in step 221. The operator can adjust the controller 100 so that the maximum output from the density meter 95 represents a specific density value. Similarly, the operator can recalibrate the controller 100 so that the lowest output from the density meter represents a zero density value. Thus, for example, if the density meter provides an output that ranges between 0.004 to 0.02 amperes, the controller would correlate the 0.004 amps to a zero density, and would correlate the 0.020 amps to the maximum density value, which might be, for example, 20.0 PPG.

The controller then asks the operator to set the time in step 222. The clock is set by moving the cursor over a digit and decrementing the digit until the desired entry is displayed. Once all the digits are entered, the operator selects "Accept" to store the new time. The time will be stored and updated even though the system controller's power is not on.

Next, the operator is asked in step 223 to set the maximum and minimum pulse width modulation ("PWM") settings for the dry and water valves. Each setting adjusts the minimum and maximum power ultimately delivered to the valve. The settings are in count values from 0 to 4095. The operator can choose the "Increment" or "Decrement" switch on the system controller's front panel to enter the water valve minimum, water valve maximum, dry valve minimum, and dry valve maximum outputs.

In steps 230 and 231, the operator can adjust the slope of the initial "guess" for the water pump and dry valve. The water slope is a value that is multiplied by the discharge rate to obtain a pulse width initial value. Likewise, the dry initial guess will use the dry gallons per minute calculation multiplied by the water defined dry slope entered in step 231, to obtain an initial dry pulse width value.

After all the above mentioned steps are complete, the system controller 100 again displays the main menu to the operator. If at any time during the calibration/setup procedure, the operator desires to leave this mode, the "Escape" key can be depressed sending the operator back to the main menu.

3. Run Mode

If the operator selects the Run option off of the Main Menu, the system controller 100 checks the "Auto/Manual" switch to branch to the desired operation. In manual mode, the operator can adjust controls to increase or decrease the dry or water valve flow rates. When the switch is moved to the "Auto" position, the system controller 100 begins auto operation and disables the manual controls.

In step 301, the controller calculates the current stage and running parameters, and then displays a screen for the operator. The displayed screen preferably includes mix water flow rate, discharge flow rate, target density, actual density measured by the density meter 95, the stage, the total discharge, the stage discharge, and the time.

After the screen is displayed (or updated), the controller 100 determines in step 303 if the operator has requested that the system proceed to the next stage. This preferably is done by depressing a preselected switch for a predetermined minimum time.

In step 305, the controller 100 determines whether the PPG trim feature has been activated and, if activated, determines the amount of trim selected. As explained in more detail below, the trim feature allows the operator to manually alter the mix water/dry cement ratio.

In step 307, the controller 100 reads the tub level measured by tub level sensor 65 and scales that measurement to a physical unit (such as feet or inches) for future reference. Using the scaled value, controller 100 then generates a tub level reference by performing a barrel shifter function. More specifically, in the preferred embodiment, controller 100 includes a register having a ten segment array capable of storing ten historical values of tub level. At clocked intervals, preferably once per half second, a new tub level value is obtained from level sensor 65. The new measured and scaled tub level value is loaded into the barrel shifter and the ten values in the barrel shifter are updated according to the following formula:

New $X_9$ = 1/2 (Previous $X_9$ + Measured and scaled tub level value)
New $X_8$ = 1/2 (Previous $X_8$ + New $X_9$)
New $X_7$ = 1/2 (Previous $X_7$ + New $X_8$)
New $X_6$ = 1/2 (Previous $X_6$ + New $X_7$)
.
.
.
New $X_0$ = 1/2 (Previous $X_0$ + New $X_1$)

The new $X_0$ is then assigned as the tub level reference that is used by controller 100 in step 362 described below. As can be seen, a new $X_0$ or tub level reference will be generated for each cycle of the controller, which in the preferred embodiment occurs approximately once per half second. Thus, the tub level reference is not a fixed value, but is one that can gradually change and one that will "float" with the natural tub level tendencies of the system. In this manner, the effect of the measured tub level value on the tub level reference is filtered (by the above-described barrel shift function or by any suitable averaging technique) and time delayed (as a result of the time it takes to clock through all ten segments of the barrel shifter array.)

In step 308, the controller 100 checks the tub level measurement against preset limits. If the tub level is too low, the controller 100 increases the water and dry delivery rates to fill up the tub. The mixing rate into the tub is increased by a fixed amount while the tub level reference is moved upwards once a second. By moving the tub level reference, the dry valve will increase dry delivery thus maintaining proper cement proportions. The same logic is applied to the tub if the level is too high except the mix water is decreased with the tub level reference, thus lowering the tub level.

In step 309, the tub level is compared against different references to return the system to normal mode. When the tub level either increases or decreases (depending on whether step 307 detected a too high or too low tub level) past a different limit, the system returns to normal mode.

In step 310, the controller 100 reads the density measured by density meter 95 and scales that measurement to a physical unit (such as pounds per gallon or PPG). These data are used in the operator display and in step 311 below.

In step 311, the controller determines if the automatic density correction feature has been enabled by the operator. In the preferred embodiment, a switch is provided that permits the operator to automatically correct the density through the use of the density meter 95 as a feedback device.

In normal operation, the controller maintains the level in slurry in Chamber B constant, and then determines the amount of mix water and dry cement that is being discharged as slurry. These numbers are used to automatically regulate the rate of mix water and dry cement being input to the mixing chamber. In addition to this normal operation, the ACS also has the capability to monitor the actual density of the slurry by means of the density meter 95. According to the preferred embodiment, the operator must select this feature.

If the automatic density correction feature is selected and the process is determined "steady" by steps 376–381, the controller determines if the actual density measured by the density meter 95 is above or below the target density. If the actual density is higher than the target density, the density value used in the cement-to-water ratio calculation is automatically decreased, which will result in the actual density being decreased as ratios of mix water and dry cement are changed.

Conversely, if the measured density is low, the density value used in the cement-to-water ratio calculation is automatically increased, thus causing the actual density to increase as the ratio of mix water and dry cement change. According to the preferred embodiment, the correction value is only increased or decreased each cycle by the auto correction percentage entered by the operator in step 213. This is done to prevent overcompensation and wide fluctuations.

Figure 5:
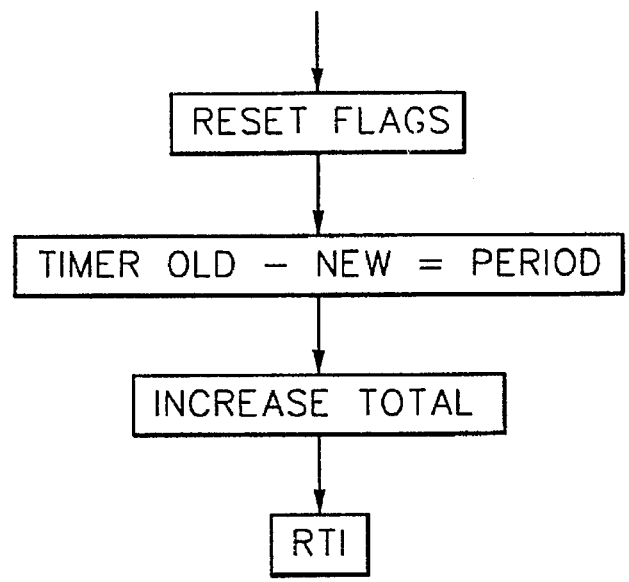
FIG. 5 is a flow chart showing how the rate and total volume of the mix water is measured.

If the automatic density correction is not selected, or if after it is complete, the controller in step 312 determines what the actual mix water flow rate is into the mixing chamber. To determine the mix water rate, the controller proceeds to the low level interrupt shown in FIG. 5 to gather the period for measurement and the amount of flow. FIG. 5 is a subroutine that measures pulses off of the input flow meter 37 and generates a period and a total. The controller, in step 312 uses the total number of pulses for the period, and determines the amount of flow by referring to the k factor obtained during calibration and set-up for the mix water flow meter. Once the amount of flow and period are ascertained by the controller, the flow is divided by the period to obtain the mix water flow rate.

Figure 6:
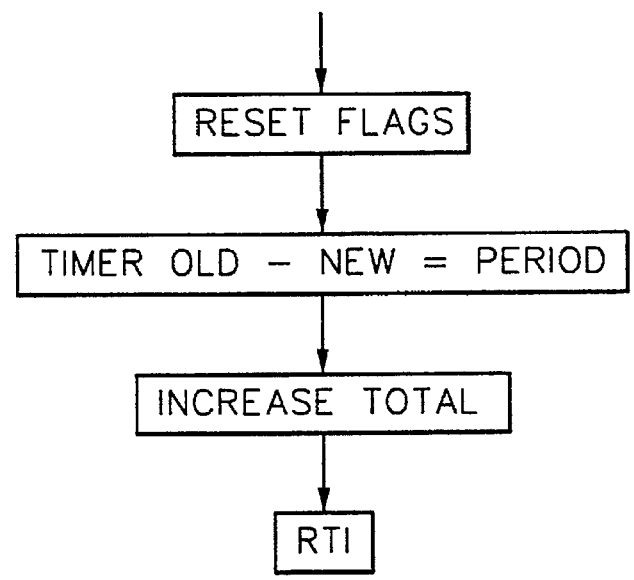
FIG. 6 is a flow chart showing how the rate and total volume of slurry discharged is generated.

In similar fashion in step 313, the controller determines the slurry discharge rate. The controller proceeds to the low level interrupt shown in FIG. 6. FIG. 6 is a subroutine that measures pulses off of the discharge flow meter 87 and generates a period and a total flow. The controller uses the total number of pulses generated by the discharge flow meter for that period, together with the k factor obtained during calibration and set-up for the discharge flow meter, to determine the amount of slurry discharged during the period. The controller then divides the amount of slurry discharged, by the period, to determine the discharge flow rate.

In step 315, the controller checks to determine if the discharge rate has changed by more than one-half of a barrel in a second. If such a change is detected, the controller reverts to the start-up mode. Next, in step 317, the controller determines if the slurry discharge rate has passed below a minimum threshold. If this occurs, the ACS is shut down.

In step 319, the controller 100 determines the percentage of volume of cement slurry that should be mix water, and then calculates the proper mix water flow rate. According to the preferred embodiment, the controller determines the percentage of mix water (or fluid) by volume in the cement slurry. This is done by first determining the percentage of dry cement by volume of slurry as follows:

$$\% \text{ VOLUME OF CEMENT} = (\text{SLURRY SG} - \text{FLUID SG})/(\text{CEMENT SG} - \text{FLUID SG}), \quad (1)$$

wherein

SLURRY SG represents the target or desired density of slurry in specific gravity units. This means the target density, which according to the preferred embodiment is entered in pound per gallon (PPG) by the operator in step 204, must be converted by controller 100 into specific gravity units;

FLUID SG represents the density of the input fluid in specific gravity units, as entered by the operator in step 206. Where water is used as the input fluid, this number is 1.0; and CEMENT SG represents the absolute density of the dry cement in specific gravity units, as entered by the operator in step 208.

Once the percentage volume of cement (% VOLUME OF CEMENT) is calculated, the percentage volume of liquid may be easily calculated, as follows:

$$\% \text{ VOLUME OF LIQUID} = 1.00 - \% \text{ VOLUME OF CEMENT.} \quad (2)$$

After the controller 100 determines the % VOLUME OF LIQUID, the controller in step 320 multiplies this number by the DISCHARGE FLOW RATE determined in step 313 to determine the optimal rate at which the input fluid (or mix water) should be supplied to the mixing chamber.

When in tub adjust mode, the controller 100 will correct for a tub level that is too high or too low. If the tub level is too high (too full), the controller 100 will decrease the water injection rate to allow the tub level to decrease until step 308 senses a proper tub level and disables tub adjust mode. Conversely, if the tub level is too low (not full enough), the controller 100 increases the water injection rate until step 308 disables the tub adjust mode.

In step 321, after the optimal mix water rate is determined in step 320, this optimal rate is compared with the mix water rate measured in step 312 to determine if the measured mix water rate is less than the optimal rate. If the measured rate is less than the optimal or desired rate, the controller 100 determines if the ACS is in a start-up mode in step 322. Depending on whether the ACS is in a start-up mode, the controller 100 accesses one of two look-up tables—one for start-up mode and one for normal "run" mode. Each of the look-up tables defines a step rate associated with the particular magnitude of error between the measured mix water rate and the desired or optimal mix water rate. Each magnitude of error is associated with a particular step rate in the look-up table. The step rate represents how quickly the mix water rate will be increased or decreased.

For example, if the controller determines in step 321 that the measured mix water rate is 5 gallons per minute less than the optimal rate, the controller, in step 323 or 324 (depending on whether the ACS is in start-up or normal operation), will access a look-up table, determine what step rate is associated with a discrepancy or error of 5 gallons per minute. If the error or discrepancy is very small, the step rate may be zero to reflect no change and to prevent overcompensation. In the preferred embodiment, the look-up is preprogrammed into read only memory ("ROM").

After the controller determines the appropriate step rate is either step 323 or 324, a direction flag is activated to remind the controller that the actual mix water rate must be increased. Conversely, in steps 325, 326, and 327, if the mix water rate is too high, the controller determines the magnitude of the error or discrepancy between measured mix water rate (step 313) and optimal mix water rate (step 320), and determines from the appropriate look-up table what the proper step rate is. After the step rate is determined, the direction flag is activated down to remind the controller that the actual mix water rate must be decreased by the step factor.

Because a separate look-up table is used for the start-up mode and for normal operation, the reaction of the system can be fine-tuned to permit quicker (or slower) response for start-up than would be desired for normal run mode. After the appropriate step rate and directional information has been found, it can be stored in step 329. In the preferred embodiment, the information is stored by means of pulse width modulation counts.

Figure 4:
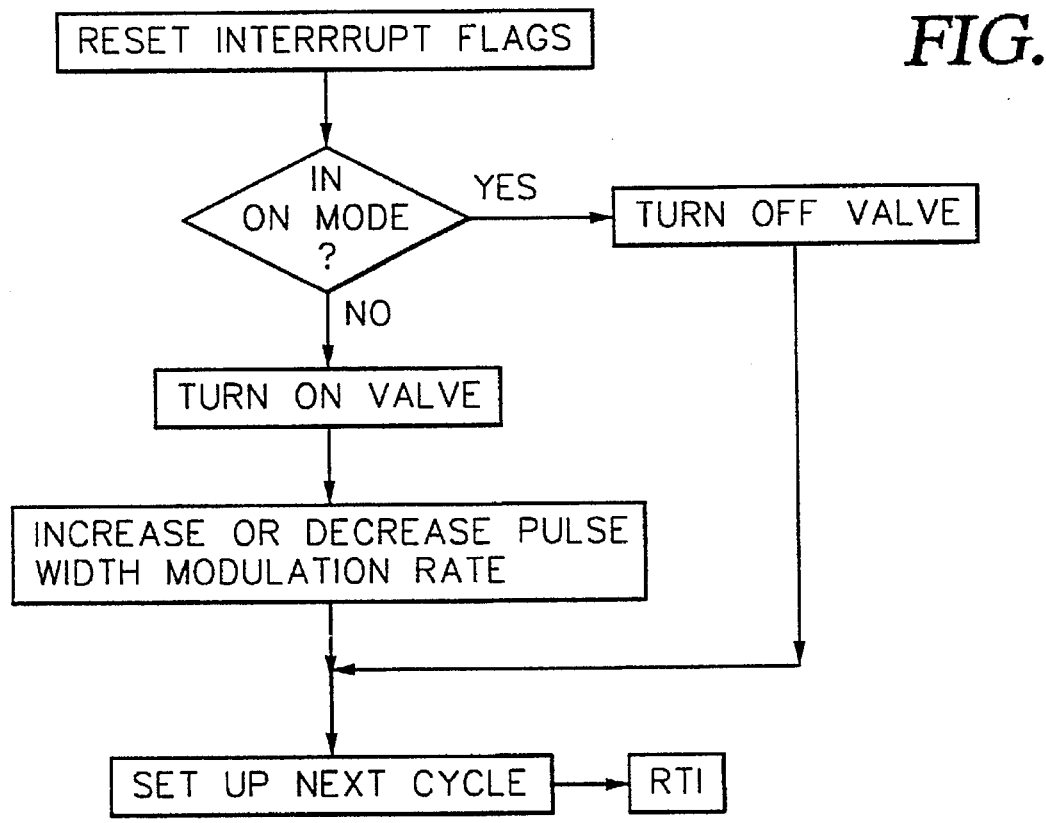
FIG. 4 shows a flow chart of the mix water interrupt for controlling the rate at which fluid is supplied to the mixing chamber of FIG. 1.

The stored step rate and directional information for mix water rate is retrieved by the interrupt task shown in FIG. 4 and supplied to pump 35 to modify the mix water input flow rate. In the preferred embodiment, the interrupt of FIG. 4 occurs at a 0.01 second rate. As shown in FIG. 4, the controller 100 increases or decreases the speed or position of the input water device 35 in accordance with the step rate and directional information.

When in initialization mode, the system controller 100 makes a first guess at the mix water pump rate in step 328. The value loaded into 329 is based on the discharge rate using a linear equation that then calculates a PWM value, representing a first guess at mix water pump speed.

Figure 7:
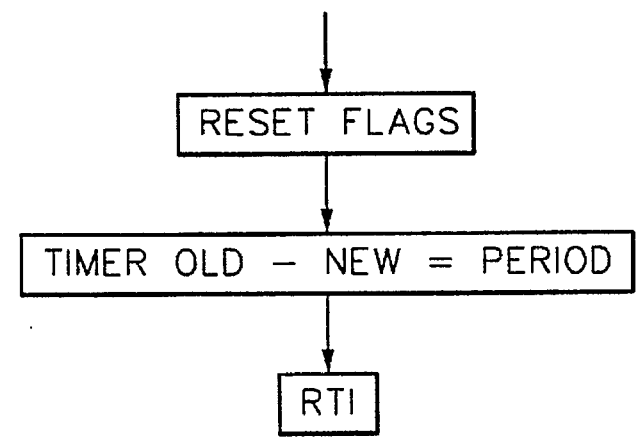
FIG. 7 is a flow chart showing how the rate of the dry cement is measured.
Figure 8:
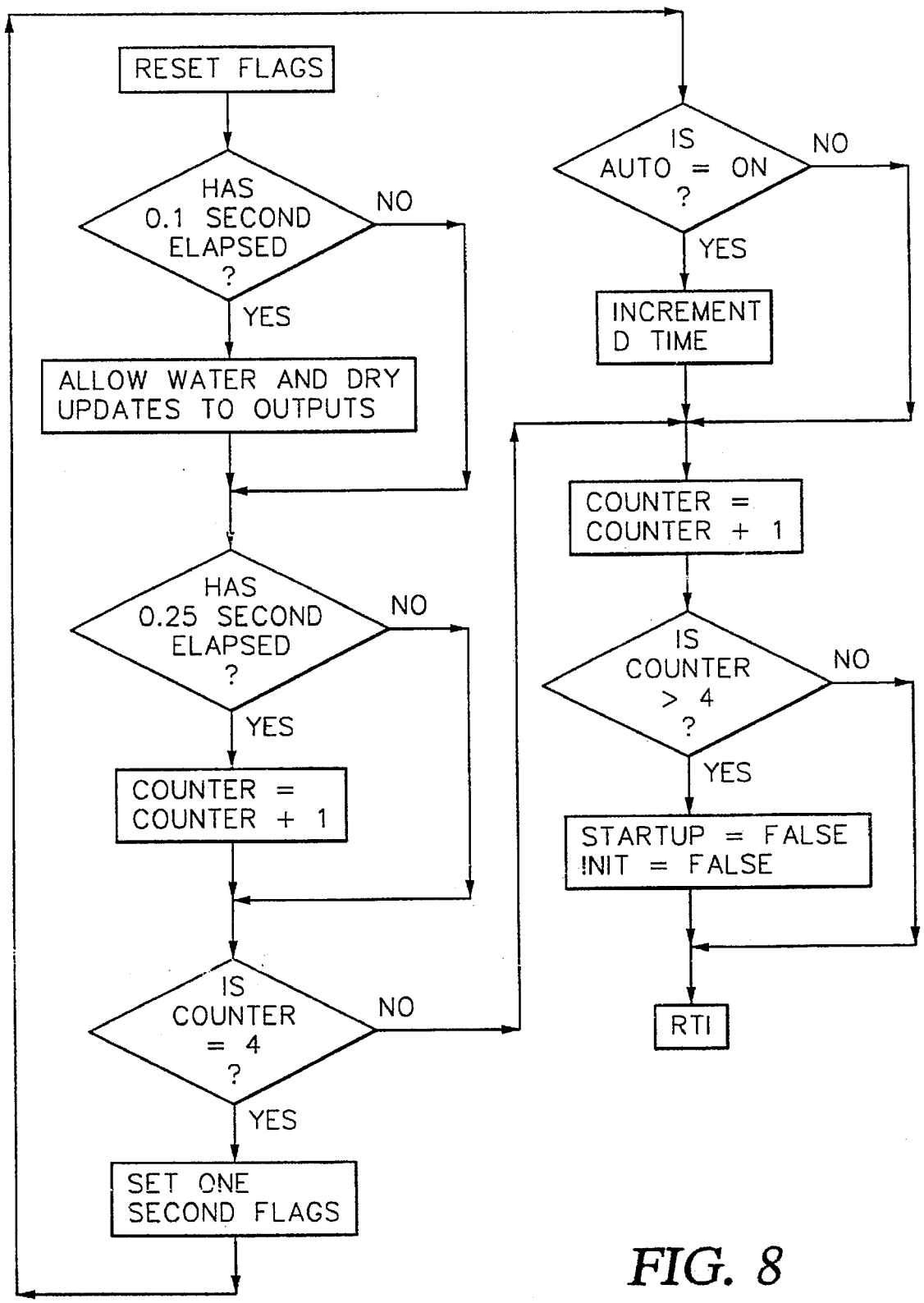
FIG. 8 is a flow chart showing how the internal controller timers are generated.

In step 335, the controller 100 obtains the rate at which dry cement is supplied by dry cement source 40. A sensor 47 on the dry cement source 40 generates pulses that are retrieved in the low level interrupt of FIG. 7. The controller 100 converts the pulses into rate information by means of the k factor as set by the operator in the calibration and setup procedure previously described.

After determining the rate at which dry cement is being introduced into the mixing chamber, the controller determines in step 337 if the system is in the start-up mode and branches accordingly. Regardless of whether the system is in start-up, the controller performs a number of calculations in steps 335, 336 to determine the amount of bulk cement theoretically required.

The first calculation performed in steps 335, 336 is to determine the DRY GALLONS PER MINUTE.

The Dry Gallons per minute is a measure of the amount of dry cement being delivered to the tub real-time. It is calculated by using the formula:

$$\text{DRY GALLONS PER MINUTE} = \text{Cubic feet of feeder} * \text{dry RPM} * \text{Efficiency} * \text{tub factor} * 3.59$$

The cubic feet of the feeder is a volumetric measurement of the dry feeder at 0 RPM. As RPM increases, the efficiency of the cement delivered decreases due to mechanical limitations. Therefore an efficiency factor based on RPM is added to the calculation to compensate. The formula is:

$$\text{DRY EFFICIENCY} = E_{max} - \text{Dry RPM} * [E_{max} - E_{min}]/40$$

Where Emax is the maximum efficiency at 5 RPM and Emin is the minimum efficiency at 40 RPM.

The constant 3.59 is an empirically derived value that is a standard among cementers to compensate for the amount of air in a cubic foot of cement.

The tub factor is derived in step 366 and represents a further inefficiency in the dry delivery valve. The tub factor in a properly running system should approach the value of 1 as the tub fills with dry cement. Otherwise the dry delivery system is out of cement or the slurry rate is too high or too dense for proper operation. A more detailed discussion of the tub factor exists in step 366.

Finally, the controller determines the desired theoretical rate of dry cement ("DRY DEMAND") to be supplied as follows:

$$\text{DRY DEMAND} = \text{DISCHARGE FLOW RATE} * \% \text{ VOLUME OF CEMENT} \quad (6)$$

Where DISCHARGE FLOW RATE is the measured discharge flow rate found in step 313; and % VOLUME OF CEMENT is the percentage of dry cement by volume of slurry, as calculated in step 319.

If the controller determines in step 337 that the ACS was in a start-up mode, the controller branches to path 341. After calculating in step 336 the rate of dry cement theoretically required, the controller compares this rate with the actual rate determined in step 335. If the controller determines in step 344 that the actual rate at which dry cement is being delivered is lower (or higher) than the desired theoretical rate, then the controller branches to step 346 (or step 348) where a step rate is obtained and a directional flag is set. The step rate preferably is found in a look-up table, associated with a particular magnitude of error. Thus, the controller 100 determines the error or discrepancy between the actual dry cement rate and the desired theoretical rate, and looks up that error in the look-up table to find the step rate that should be used to correct the actual rate at which dry cement is delivered.

After the step rate is found, the barrel shifter in controller 100 is loaded in step 350. Because the system is in the start up mode, the barrel shifter will not contain the historical values in its registers that are necessary to generate the tub level reference in step 307. To provide a means to generate the tub level reference, the controller loads the measured level from sensor 65 into all ten of its registers in step 350.

If it is determined in step 337 that the ACS is not in a start-up mode, then the controller follows branch 342. Next, the controller in step 360 determines the actual or real time level in Chamber B from sensor 65. In step 362, the controller compares the real time tub level measured in step 360 with the tub level reference stored in memory at step 307.

If the ACS is in tub adjust mode, an error is either added or subtracted from the tub level reference stored in memory. This error is introduced every second (step 355) and represents the theoretical change in tub level per second while the tub is adjusting. The error is added if the tub is too low thus allowing for more dry cement matching the water demand in 320 or subtracted if the tub is too high. The error term goes to zero when step 308 transitions the controller 100 back to normal mode.

In step 366, the controller 100 will attempt to maintain a constant tub level by comparing the tub level sensor 65 value to the level derived by step 307. The error between these terms will create a correction factor called the tub factor. A tub factor of one means the error between the actual and derived dry delivery is 0. As the tub factor increases, the calculated dry gallons per minute increases thus slowing the dry delivery system to maintain constant dry cement flow. Conversely, as tub factor decreases toward 0, the dry cement calculated will decrease. This scheme allows the ACS to produce a compensation factor for dry delivery efficiency since this is the most unpredictable part of cement mixing. This factor is clipped between 0 and 4 in steps 367 and 368.

The tub factor equation is as follows:

$$\text{TUB FACTOR} = \text{Previous TUB FACTOR} - [\text{Tub level reference} - \text{Tub level actual}]/\text{tub gain}$$

The system controller 100 first determines if it is in initialization mode in step 373. If so, controller 100 uses a linear equation to predict the dry valve RPM in step 374. The RPM is then converted into a PWM value and loaded into the dry output register. This allows for a faster start-up when making the transition from manual to auto mode.

Figure 3:
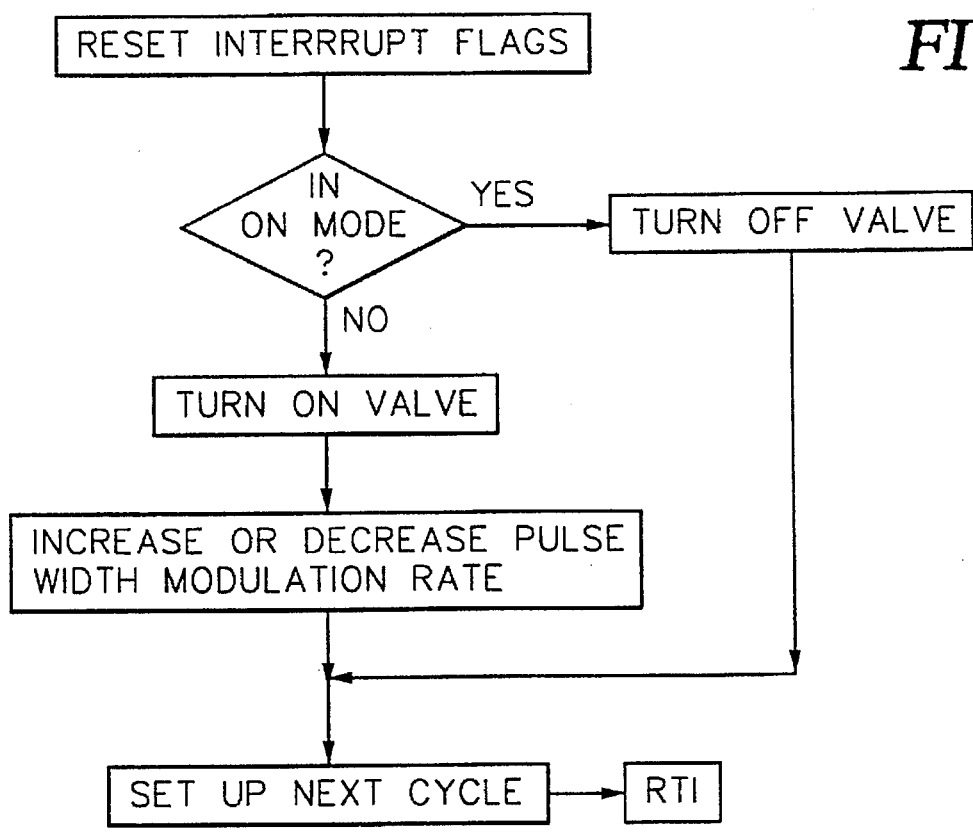
FIG. 3 shows a flow chart of the dry feed interrupt for controlling the valve of the dry cement delivery system of FIG. 1.

Next, in step 370, the controller compares the modified dry demand rate at which dry cement should be delivered with the actual rate. In steps 371 and 372 the controller determines the appropriate step rate from the look-up table. After the appropriate step rate has been found, the controller in step 375 shows the step rate and directional information, preferably in a pulse width modulated signal. This signal is retrieved in the Dry Feed Interrupt of FIG. 3. As shown in FIG. 3, the speed or position of the dry cement valve is altered according to the step rate and directional rate obtained from steps 371 or 372. In step 380, the controller determines if the tub is maintaining a constant level and sets the appropriate flags.

The next logic to be performed is determining if the density is steady. Step 376 establishes a one second time reference before checking against the present density value. After the one second has elapsed, the error between the present measured density and the density for the previous second is calculated in step 377. Step 378 adjusts for a negative error by calculating the absolute value of the error. Next, in step 379, the absolute value of the error is checked against the stability error window, as entered by the operator in step 213. If the density error is less than the stability error window, then the steady counter is incremented. Since this portion of code (steps 376–381) is only performed once per second, each tick of the counter equals one second. Once the steady counter is greater than the stability time as entered by the operator in step 213, the steady flag is equal to true (step 381). Otherwise, the steady flag is not set to true. If the stability test fails in step 379, the steady counter is set to zero and the steady flag is set to false.

As will be understood by those skilled in the art, the tub level and dry cement input rate are controlled by means of the PI (proportional-integral) feedback loop shown in FIG. 2F by steps 360 through 375, similar to the water PI loop as described in steps 321–327.

In step 380, the difference between the tub level measured one second earlier and the present tub level is determined. If this difference is less than a predetermined limit, the system controller 100 will set the "steady" flag, otherwise the system controller will clear the "steady" flag. The "steady" flag is used by the display routine to indicate to the operator that the process is within limits. If the "steady" flag is not set, the operator can then assume that the tub level and slurry density could change beyond the specified control limits.

II. ACS OPERATION

The operation of the ACS system will now be described with reference to FIG. 1. The operation of the ACS preferably comprises an initialization mode, a start-up mode, a run mode, a trim mode, and a rate variance mode.

A. Cementing Initialization

To initiate the ACS, the operator manually (1) opens the input water valve 36 (not shown) to permit water to flow into the mixing chamber 60; and (2) adjusts the speed of the rotary valve 45 to regulate the delivery of dry cement into the mixing chamber 60. Because the discharge valve 85 has yet to be opened, the slurry will be forced to recirculate through recirculation line 90. As the slurry flows through recirculation line 90, the density meter 95 measures the density of the slurry. Alternatively, the density can be measured manually by an operator.

Recirculation continues in this manner until two conditions occur: (1) the density measured is the same as the target or desired density, and (2) the level of cement in Chamber B of mixing Chamber 60 lies between the levels marked in FIG. 1 as $x_0$ and $x_1$. At any time prior to starting the run mode, the operator enters the following information into the system controller 100 for each operating stage: (a) the desired or target slurry density (PPG); (b) the density of the water or other base liquid being supplied through input line 30 (in specific gravity units); and (c) the density of the dry cement being used (in specific gravity units).

B. ACS Startup

After the ACS system has been initialized, the operator opens the discharge valve 85 to allow the cement slurry to be discharged through discharge line 80. At this time, the ACS controller 100 receives an output signal from the discharge flow meter 87 indicating that discharge flow has begun. The operator also manually sets the discharge pumps 89 located downstream in the slurry discharge line 80 to operating speed. When the discharge pumps 89 are brought up to operating speed, the level of slurry in Chamber B begins to fall.

Simultaneously, ACS controller 100 regulates the input water rate by adjusting the fresh water pump 35 to maintain a constant high precision ratio of input water rate to discharge cement rate. This is done by receiving a signal that represents the rate of flow of cement slurry through the discharge flow meter 87 and by determining the percentage of water by volume in the cement slurry. The controller 100 multiplies the discharge flow rate by the percent of water by volume to determine the amount and rate of water that is being discharged. Once this flow rate of water is determined, the controller 100 adjusts the fresh water pump to this rate. Thus, the controller 100 precisely controls the rate at which water is injected into the mixing chamber 60 so that it is the same as the amount of water that is discharged from the mixing chamber 60 (as part of the slurry). As a result, it is possible to obtain very precise control of the density of the slurry.

According to the preferred embodiment, the controller 100 determines the percentage of water (or liquid) by volume in the cement slurry by first determining the percentage of dry cement by volume in the slurry. The percentage of cement by volume of slurry is calculated as follows:

$$\% \text{ VOLUME OF CEMENT} = (\text{SLURRY SG} - \text{FLUID SG})/(\text{CEMENT SG} - \text{FLUID SG}),$$

wherein

SLURRY SG represents the target or desired density of slurry in specific gravity units. This means the target density, which according to the preferred embodiment, is entered in pound per gallon (PPG) by the operator in step 204, must be converted by controller into specific gravity units;

FLUID SG represents the density of the input fluid in specific gravity units, as entered by the operator in step 206. Where water is used as the input fluid, this number is 1.0; and CEMENT SG represents the absolute density of the dry cement in specific gravity units, as entered by the operator in step 208.

Once the percentage volume of cement (% VOLUME OF CEMENT) is calculated, the percentage volume of liquid may be easily calculated, as follows:

$$\% \text{ VOLUME OF LIQUID} = 1.00 - \% \text{ VOLUME OF CEMENT}.$$

This equation assumes that only two ingredients are combined to form the slurry—input liquid and dry cement. Additives may be provided as long as they are added to either the dry cement or to the input liquid prior to their introduction to the system.

After the controller 100 calculates the % VOLUME OF LIQUID, the controller 100 multiplies this number by the DISCHARGE FLOW RATE to determine the rate at which the input fluid should be supplied to the mixing chamber 60. The controller then sets the input pump at the proper speed to supply the input liquid at the requisite rate. The controller monitors the output from the input flow meter 37 to adjust the input pump 35 to the proper setting.

For example, if the discharge flow meter indicates that slurry is being discharged at 420 gallons/minute, and the controller determines from the operator inputs that the % VOLUME OF CEMENT is 0.519, then the controller determines that the % VOLUME OF FLUID is 0.481. The controller 100 multiplies the % VOLUME OF LIQUID by the DISCHARGE FLOW RATE, as follows: 0.481×420 gallons/minutes=202 gallons/minute of input liquid. The controller 100 then sets the speed of the fresh water pump 35 at a speed to inject 202 gallons/minute. The input flow meter 37 provides feedback to the controller 100 of the actual rate of liquid being injected into the mixing chamber 60 to permit the controller to readjust the speed of the fresh water pump 35 to precisely control the rate at which liquid is supplied to the mixing chamber 60.

At approximately the same time that the ACS controller 100 is setting the speed of the fresh water pump 35, it also is adjusting the speed of the valve 45. The ACS controller 100, as noted, determines the amount of liquid that must be injected into the mixing chamber 60 to obtain the desired slurry density at the fixed discharge rate. At the same time, the ACS controller 100 also calculates the rate at which the dry cement must be delivered from the source 40 to achieve the desired slurry density.

C. ACS Run Mode

Ideally, if the input flow meter 37 is extremely accurate permitting precise control of the fresh water pump 35, and if the discharge flow meter 87 is equally accurate, and if the valve 45 is delivering cement at the proper rate, so that the amount of dry cement and water being supplied to the mixing chamber 60 exactly equals the amount of cement and water being discharged as slurry, then the level of cement slurry in Chamber B will be fixed and stable, and the actual density of the discharged slurry will equal the desired slurry density input by the operator into the ACS controller 100. In other words, if all meters and valves are completely accurate, the level of slurry in Chamber B will be constant at this time.

If, conversely, the level of cement slurry changes or fluctuates in Chamber B, then the controller assumes there has been a fluctuation in bulk density of the dry cement and modifies its bulk density calculation. The controller then determines how much to change the delivery rate of the dry cement to maintain tub level and proper slurry density. This is explained more fully in the flow chart shown in FIG. 2, and described above. Once the proper rate of dry cement is determined, the position or speed of valve 45 is changed as required.

D. PPG Trim

After the actual and desired slurry density readings are equal, it is common to take and test a sample of the cement slurry being discharged. Alternatively, another density sensor may be provided downstream in the slurry discharge line. If the density of the sample discharge (or of the second density sensor) does not correspond to the density measured by density meter 95, then the operator can elect to use the ACS PPG Trim mode by pressing an appropriate switch on the control panel (not shown). Activation of this trim switch will be transmitted to the ACS system controller 100, which, in response will cause the ACS to operate in the trim mode. The trim switch permits the operator to manually alter the mix water/dry cement ratio in response to discrepancies between the target density and measured density.

In the trim mode, the controller 100 adjusts the ratio of input water rate to discharge cement slurry rate, which was based upon the percent of water by volume obtained from the calculations relating to the cement slurry discharge. By changing this ratio, the rate at which water is to be supplied to the mixing chamber 60 also will change, as will the rate at which dry cement is delivered to the mixing chamber 60. After the speed or position of input device 35 is set, then the speed of valve 45 is set to an approximate value based upon desired demand of dry cement. The controller 100 then monitors the output from the level sensor 65 and adjusts the desired dry demand rate until the slurry level in Chamber B remains constant.

E. Discharge Rate Variance

If during ACS operation, the discharge rate changes more than the allowed fluctuation from its fixed value for any reason, then ACS returns to the Start-up Mode. After detecting a large change in the discharge rate, the controller returns to the start-up mode, where a mix water rate is calculated. The controller 100 sets the input device 35 to the necessary setting so that the amount of water entering through input line 30 equals the amount of water leaving as slurry through the discharge line 80. The input flow meter 37 is used by the controller 100 as part of a closed loop feedback system to precisely set the rate of the device 35. After the mix water input rate is set, the controller then determines the approximate speed of valve 45 that will provide the same amount of dry cement as is leaving as a component of the slurry. The controller 100 monitors the level sensor 65 and adjusts the dry cement rate as necessary to maintain the level of slurry in Chamber B constant.

Operation of the ACS system preferably continues until the total volume of slurry is discharged or until the operator indicates that it is time to begin a new stage. The controller 100 keeps track of total volume based upon the signals from the discharge flow meter 87. The controller 100 preferably obtains a signal from the discharge flow meter 87 once every 1/x of a second. Thus, the controller multiplies each rate signal from the discharge flow meter 87 and multiplies that rate by 1/x to obtain a number that represents the total volume of slurry that has been discharged during that sampling period. The controller keeps a running count of the discharged volume by adding each new volume to the total accumulated volume, and compares the new total with the desired total.

While a preferred embodiment of the invention has been disclosed, various modifications can be made to the preferred embodiment without departing from the principles of the present invention.

We claim:

1. An automatic cementing system, comprising:
   a mixing chamber for receiving liquid and dry cement, said mixing chamber mixing the liquid and dry cement together to form a cement slurry;
   an input line for supplying the liquid to said mixing chamber;
   means for supplying the dry cement to said mixing chamber, said supplying means including a means for regulating the rate at which dry cement is delivered;
   means for discharging the slurry from said mixing chamber;
   a level sensor for measuring the slurry level in said mixing chamber and generating an electrical signal representing the real time value of the slurry level;
   a system controller electrically connected to said regulating means of said supplying means and to said level sensor, said controller including:
   means for receiving the real time slurry level values from said level sensor;
   means for storing a plurality of said slurry level values periodically sensed by said level sensor;
   means for generating a reference signal by averaging said plurality of slurry level values;
   means for comparing said reference signal with the real time slurry level in said mixing chamber; and
   means for transmitting a signal to said regulating means to change the rate of delivery of dry cement to the mixing chamber in response.

2. The cementing system of claim 1 further comprising:
   means for initially setting said reference signal to be equal to the real time slurry level value as sensed by said level sensor.

3. The cementing system of claim 1 wherein said controller performs a barrel shifter function to generate said reference signal.

4. The cementing system of claim 1 further comprising means for regulating the rate at which liquid is delivered in response to the slurry level.

5. The cementing system of claim 4 wherein said controller further includes means for calibrating the means for regulating the rate at which liquid is added.

6. The cementing system of claim 1 further comprising means for calibrating the means for regulating the rate at which dry cement is delivered.

7. The cementing system of claim 1 further comprising means to adjust said reference signal in response to the electrical signal representing the real time value of the slurry level.

8. A method for automatically controlling the density of a cement slurry in a system comprising a mix water input line, a dry cement hopper with a regulating valve, and a mixing chamber for mixing the water and cement to produce a cement slurry, including the steps of:

(a) measuring the rate at which slurry is discharged from the mixing chamber;

(b) determining the percentage of water in the slurry;

(c) calculating from steps (a) and (b) the rate at which water is being discharged from the mixing chamber;

(d) setting the rate at which water is being input to the mixing chamber to be the same as the rate at which water is being discharged, as determined in step (c);

(e) determining the percentage of dry cement in the slurry being discharged from the mixing chamber;

(f) calculating from steps (a) and (e) the rate at which dry cement is being discharged from the mixing chamber;

(g) setting the regulating valve on said hopper to deliver dry cement at approximately the same rate as the rate at which dry cement is discharging from the mixing chamber, as determined in step (f);

(h) generating a reference signal that is representative of the averaged value of the slurry level in the mixing chamber over a predetermined period;

(i) detecting the real-time value of the slurry level in the mixing chamber;

(j) adjusting the regulating valve on said hopper in response to a difference between the reference signal determined in step (h) and the real time level detected in step (i).

9. The method of claim 8, further comprising the steps of:

(k) measuring the density of the slurry discharged from the mixing chamber;

(l) comparing the measured density obtained in step (k) with a desired density;

(m) calculating a correction factor based upon the difference between the measured density and the desired density; and (n) adjusting the rate at which water is being input to the mixing chamber based upon the correction factor calculated in step (m).

10. The method of claim 8 wherein the step of adjusting the regulating valve on the hopper (step (j)) comprises the step of:

(k) using a PI feedback loop.

11. The method of claim 8 wherein the step of adjusting the regulating valve on the hopper (step (i)) comprises the step of:

(k) determining an error factor based on the following formula:

New Error Factor=Previous Error Factor+(Previous Error Factor× Integral Value).

12. The method of claim 11 wherein the step of determining the error factor (step (k)) further comprises the steps of:

(l) incrementing the integral at periodic intervals.

13. The method of claim 8 wherein the step of adjusting the regulating valve on the hopper (step (j)) comprises the step of:

(k) adjusting the reference signal in response to the slurry level.

14. A method for automatically controlling the density of a cement slurry, comprising the steps of:

(a) initializing the input of mix water to a mixing chamber;

(b) initializing the delivery of dry cement to the mixing chamber;

(c) combining the mix water and dry cement to produce a cement slurry;

(d) recirculating the slurry until the density of the slurry equals a desired density;

(e) opening a discharge valve to begin discharging the slurry;

(f) measuring the discharge rate of the slurry;

(g) determining the amount of mix water that should be supplied to the mixing chamber based upon the measurement in step (f);

(h) setting an input device to provide the necessary amount of mix water as determined in step (g);

(i) determining the theoretical amount of dry cement to deliver to the mixing chamber;

(j) setting a regulating device to deliver the theoretical amount of dry cement as determined in step (i);

(k) monitoring the level of slurry in the mixing chamber;

(l) generating a reference signal representative of the time averaged value of the level of slurry in the mixing chamber;

(m) comparing the reference signal to the real time value of the slurry level;

(n) generating an error factor based upon the comparison made in step (m);

(o) periodically updating the error factor generated in step (n);

(p) adjusting the regulating device in response to the error factor generated in step (o) to maintain the slurry level constant in the mixing chamber.

15. A method as in claim 14, wherein the step of determining the amount of dry cement to deliver includes the following steps;

(i)(1) calculating the percentage of dry cement in the slurry based upon the information input in step (g);

(i)(2) multiplying the percentage of dry cement obtained from step (i)(1) by the discharge rate obtained in step (f), to determine the amount of dry cement that should be supplied to the mixing chamber.

16. A method as in claim 14, wherein the step of determining the amount of mix water that should be supplied to the mixing chamber includes the following steps;

(g)(1) inputting data regarding the target slurry density, the density of the mix water, and the density of the dry cement;

(g)(2) calculating the percentage by volume of liquid in the slurry based upon the parameters entered in step (g)(1); and (g)(3) multiplying the percentage of liquid obtained from step (g)(2) by the discharge rate obtained in step (f), to determine the amount of liquid that should be supplied to the mixing chamber.

17. The method of claim 14 wherein the step of generating a reference signal (step(l)) comprises the steps of:

(l)(1) periodically sensing the level of slurry in the mixing chamber and recording a plurality of the sensed level values; and (l)(2) averaging the plurality of recorded slurry level values.

18. The method of claim 14 wherein the step of generating a reference signal (step (l)) is periodically performed and the reference signal generated by using a barrel shifter function.

19. The method of claim 14 wherein the step of initializing the input of mix water (step (a)) further includes calibrating an input device set in step (h).

20. The method of claim 14 wherein the step of initializing the delivery of dry cement (step (b)) further includes calibrating a regulating device set in step (j).

* * * * *